(12) United States Patent
Koda

(10) Patent No.: US 12,400,354 B2
(45) Date of Patent: Aug. 26, 2025

(54) INFORMATION PROCESSING DEVICE, AND PROGRAM

(71) Applicant: DMG MORI CO., LTD., Nara (JP)

(72) Inventor: Yorihito Koda, Nara (JP)

(73) Assignee: DMG MORI CO., LTD., Nara (JP)

( * ) Notice: Subject to any disclaimer, the term of this patent is extended or adjusted under 35 U.S.C. 154(b) by 153 days.

(21) Appl. No.: 18/517,919

(22) Filed: Nov. 22, 2023

(65) Prior Publication Data

US 2024/0087158 A1 Mar. 14, 2024

Related U.S. Application Data

(63) Continuation of application No. PCT/JP2022/021261, filed on May 24, 2022.

(30) Foreign Application Priority Data

May 24, 2021 (JP) .................... 2021-086694

(51) Int. Cl.
*G06T 7/70* (2017.01)
*G06T 7/11* (2017.01)
*G06T 7/62* (2017.01)
*G06T 11/00* (2006.01)

(52) U.S. Cl.
CPC .................. *G06T 7/70* (2017.01); *G06T 7/11* (2017.01); *G06T 7/62* (2017.01); *G06T 11/00* (2013.01); *G06T 2200/24* (2013.01); *G06T 2207/20021* (2013.01); *G06T 2207/30164* (2013.01)

(58) Field of Classification Search
CPC ..... G06T 7/70; G06T 7/11; G06T 7/62; G06T 11/00; G06T 2200/24; G06T 2207/20021; G06T 2207/30164; G05B 19/18; G05B 19/409; B23Q 11/00; B23Q 17/00; B23Q 17/24; Y02P 70/10
See application file for complete search history.

(56) References Cited

U.S. PATENT DOCUMENTS

2016/0184947 A1  6/2016 Itou
2018/0236657 A1  8/2018 Kuwahara et al.
2018/0354000 A1  12/2018 Takikawa

FOREIGN PATENT DOCUMENTS

| EP | 2662183 B1 * | 4/2015 | ............ B01D 33/04 |
|----|--------------|--------|--------|
| JP | H07-108435 A | 4/1995 | |
| JP | 2016-120589 A | 7/2016 | |
| JP | 2018-134703 A | 8/2018 | |
| JP | 2019-082807 A | 5/2019 | |
| JP | 6788758 B1 | 11/2020 | |

* cited by examiner

*Primary Examiner* — Ryan R Yang
(74) *Attorney, Agent, or Firm* — IP Business Solutions, LLC

(57) ABSTRACT

An information processing device that generates a fluid discharge path for discharging fluid into a machine to move chips, includes: a detecting unit for detecting a first input signal for a first position on an image of the machine and a second input signal for a second position on the image of the machine; and a display control unit for performing control to display (i) the first position, (ii) the second position, and (iii) a discharge path connecting the first position with the second position to be superimposed on image data of the machine.

4 Claims, 26 Drawing Sheets

FIG. 2
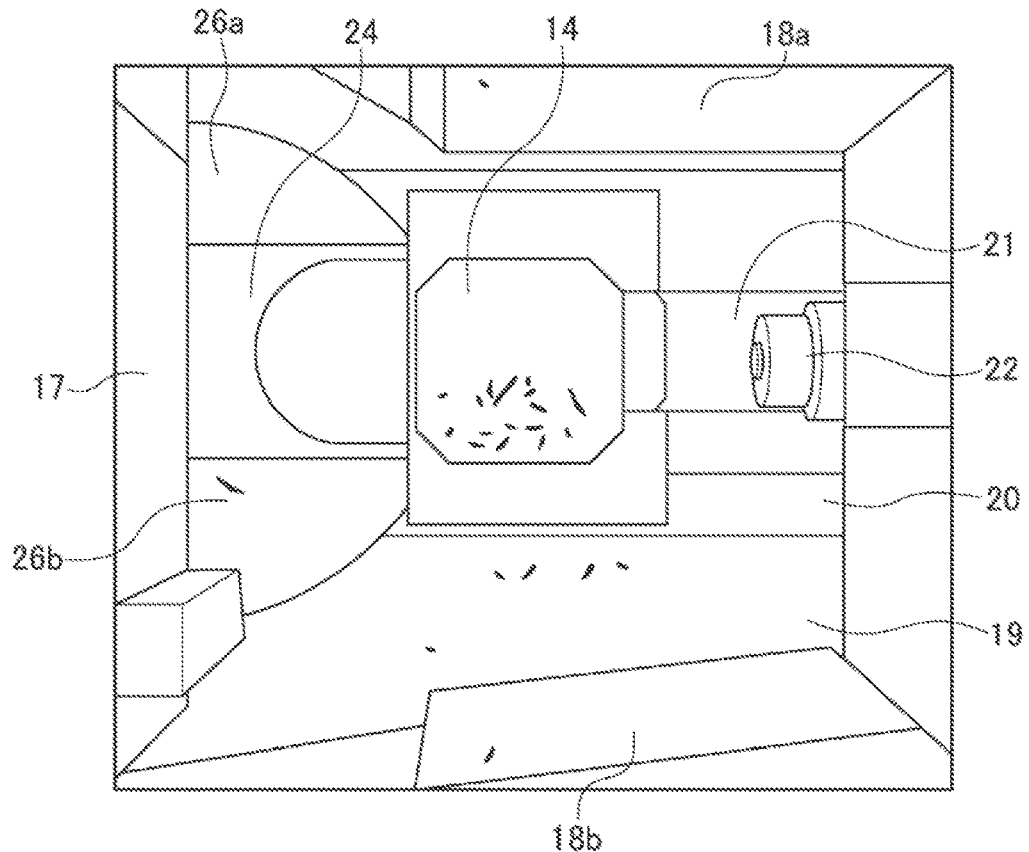
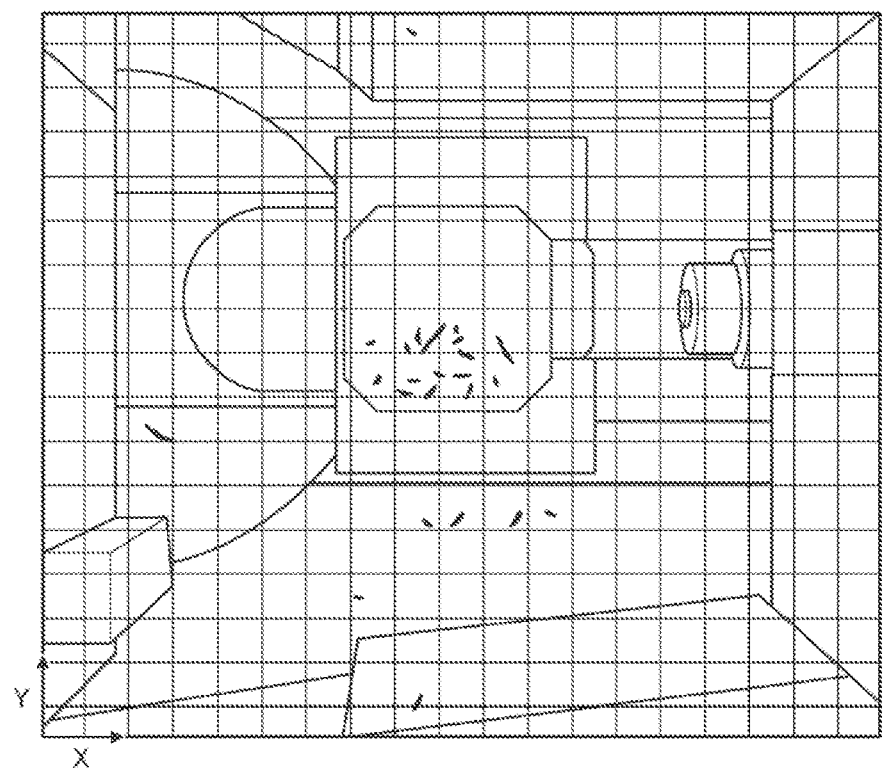

FIG. 3
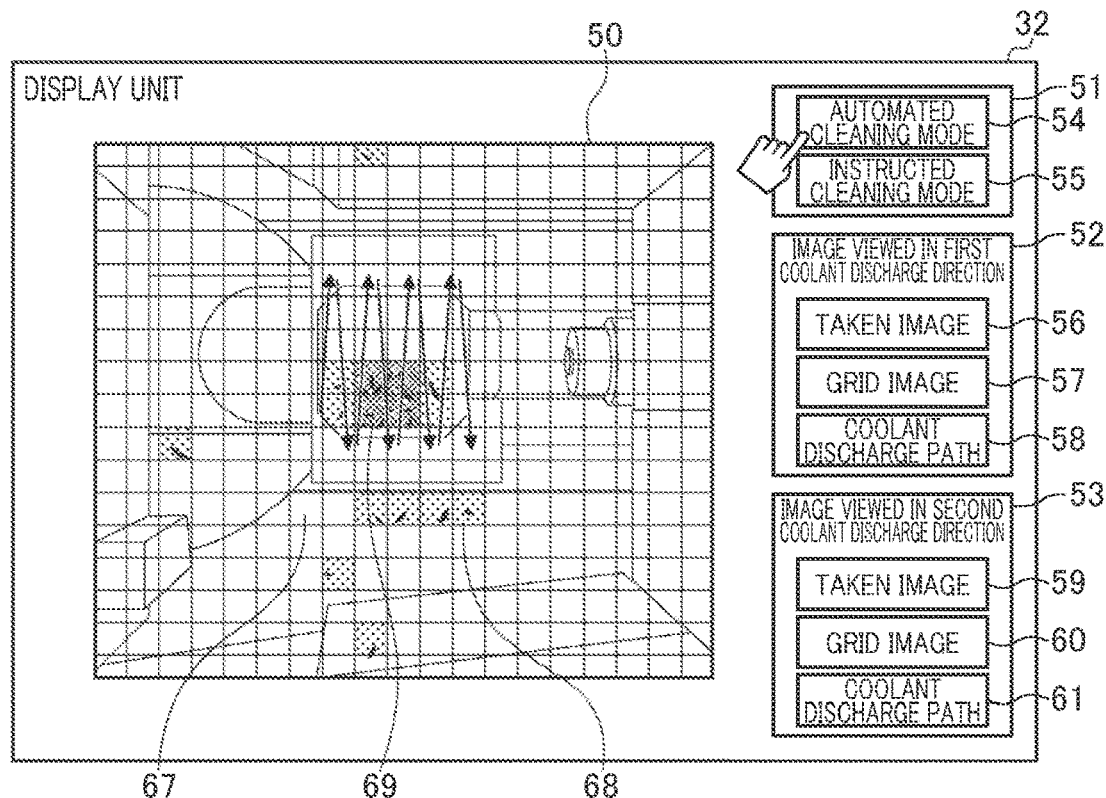
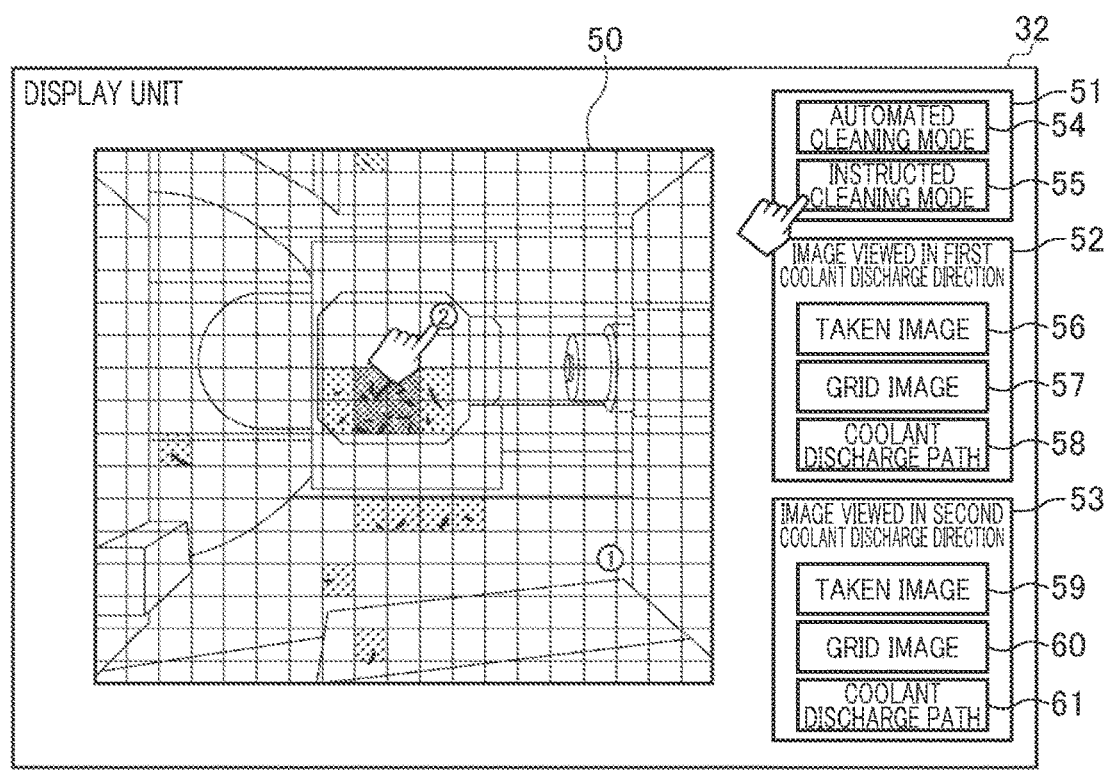

FIG. 4
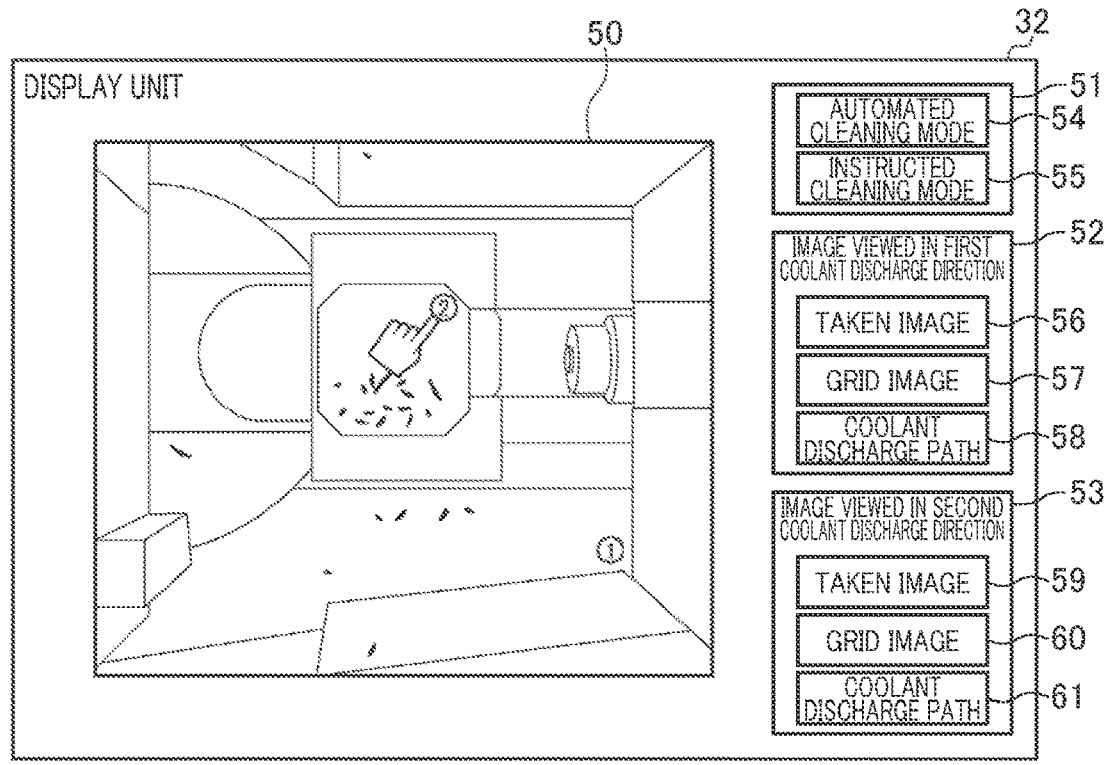
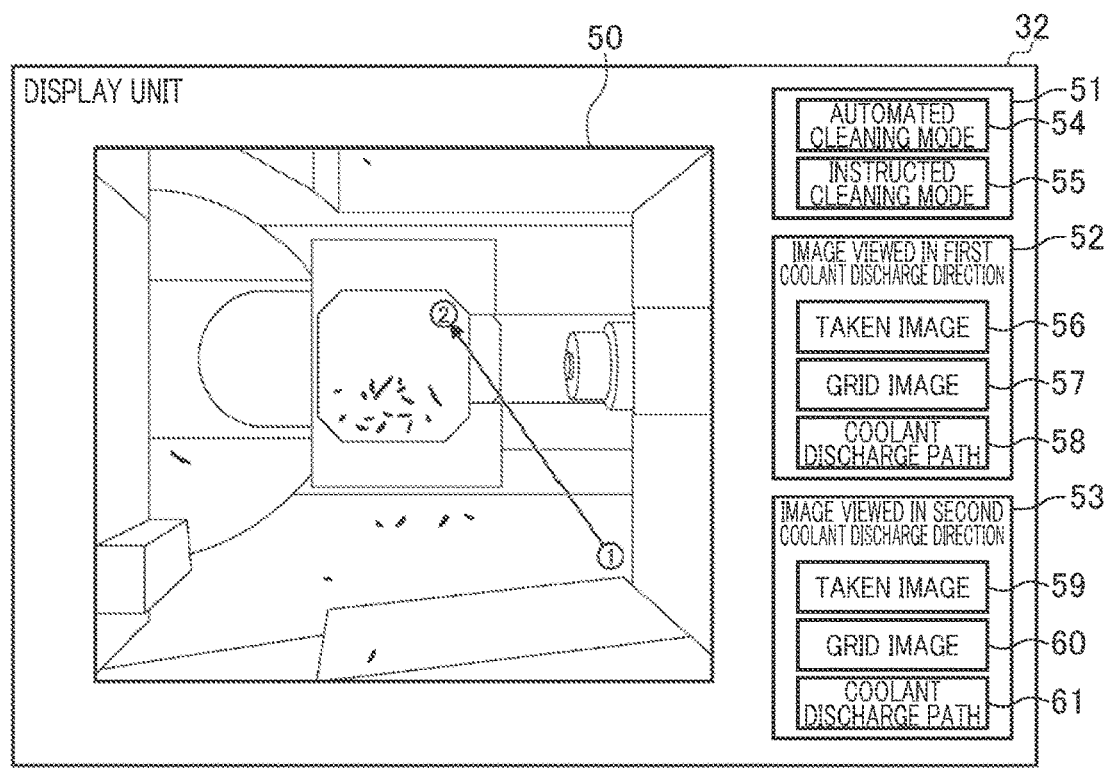

FIG. 5
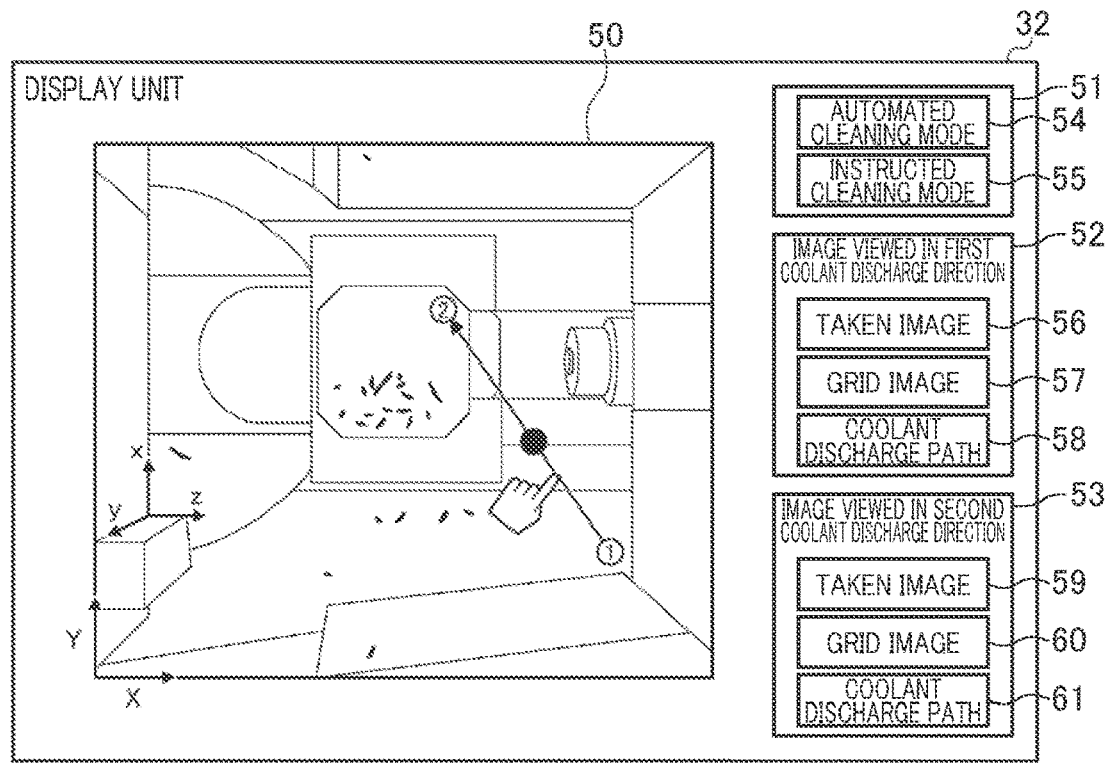
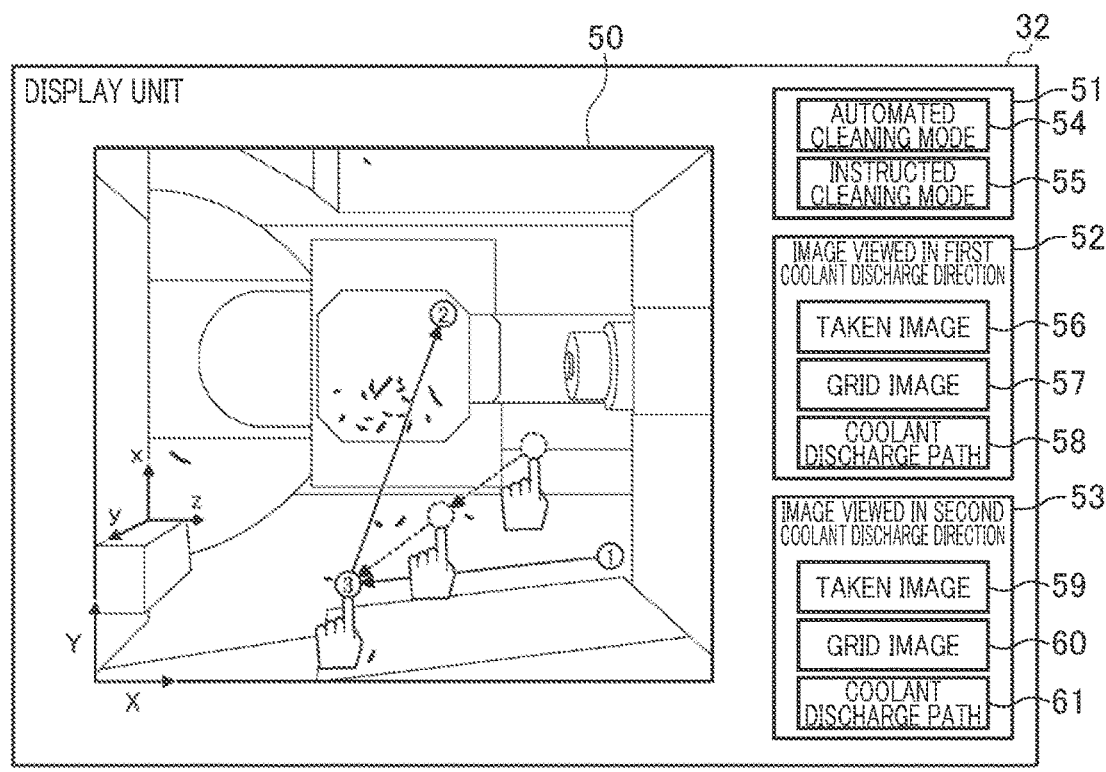

FIG. 6
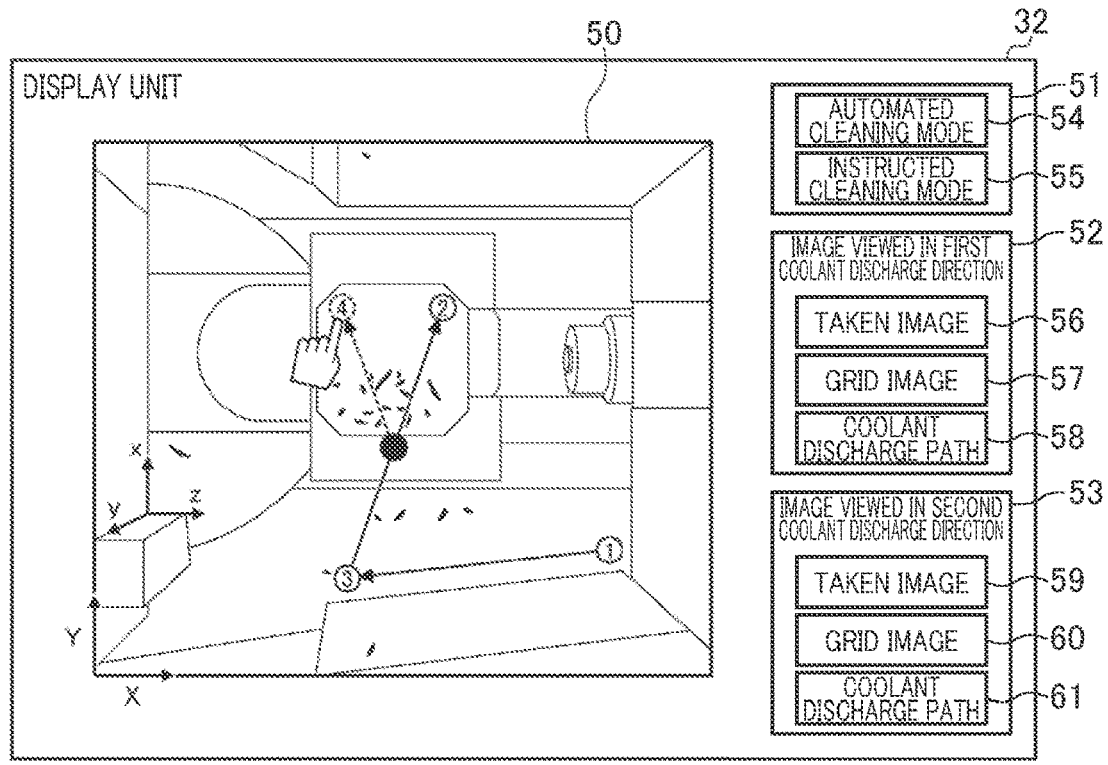
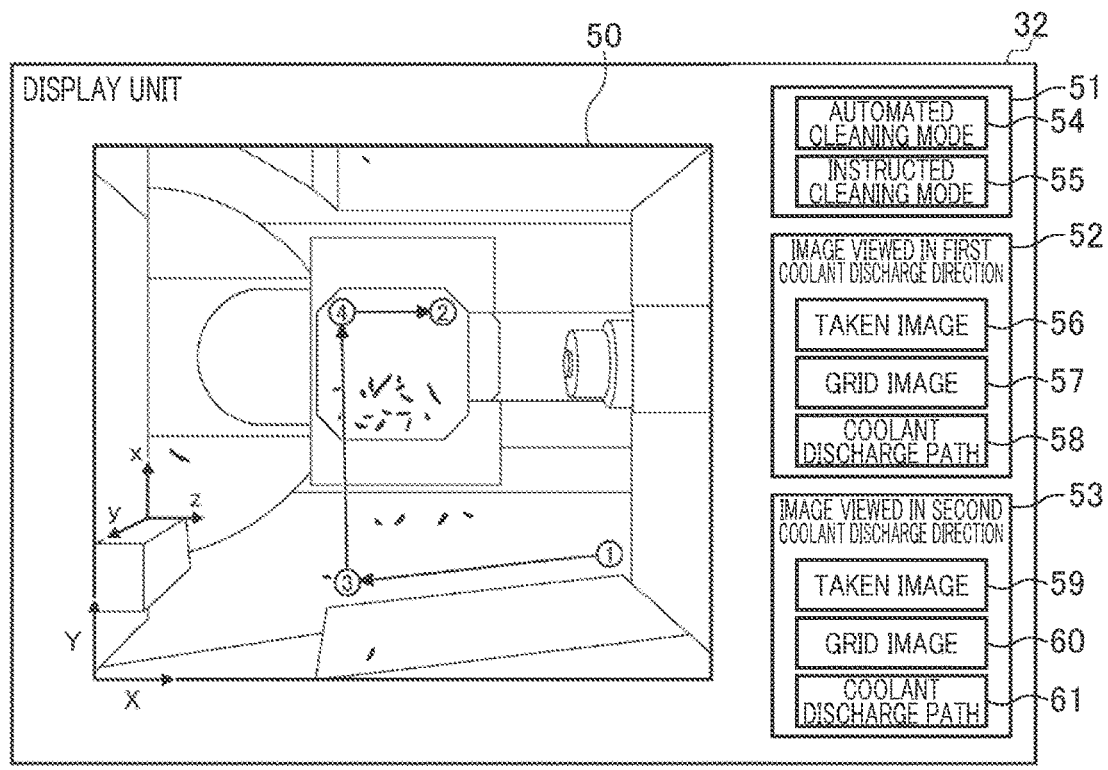

FIG. 7
(A)
| INDICATED ORDER | INDICATED POSITION | MACHINE COORDINATES |
|---|---|---|
| 1 | (X1,Y1) | (x1,y1,z1) |
| 2 | (X2,Y2) | (x2,y2,z2) |
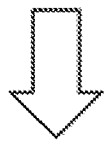
(B)
| INDICATED ORDER | INDICATED POSITION | MACHINE COORDINATES |
|---|---|---|
| 1 | (X1,Y1) | (x1,y1,z1) |
| 3 | (X3,Y3) | (x3,y3,z3) |
| 2 | (X2,Y2) | (x2,y2,z2) |
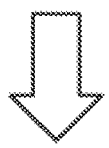
(C)
| INDICATED ORDER | INDICATED POSITION | MACHINE COORDINATES |
|---|---|---|
| 1 | (X1,Y1) | (x1,y1,z1) |
| 3 | (X3,Y3) | (x3,y3,z3) |
| 4 | (X4,Y4) | (x4,y4,z4) |
| 2 | (X2,Y2) | (x2,y2,z2) |

| INDICATED ORDER | INDICATED POSITION | MACHINE COORDINATES |
|---|---|---|
| 1 | (X1,Y1) | (x1,y1,z1) |
| 8 | (X8,Y8) | (x8,y8,z8) |
| 3 | (X3,Y3) | (x3,y3,z3) |
| 4 | (X4,Y4) | (x4,y4,z4) |
| 5 | (X5,Y5) | (x5,y5,z5) |
| 7 | (X7,Y7) | (x7,y7,z7) |
| 6 | (X6,Y6) | (x6,y6,z6) |
| 2 | (X2,Y2) | (x2,y2,z2) |

| INDICATED ORDER | INDICATED POSITION | MACHINE COORDINATES |
|---|---|---|
| 1 | (X101,Y101) | (x101,y101,z101) |
| 3 | (X103,Y103) | (x103,y103,z103) |
| 4 | (X4,Y4) | (x4,y4,z4) |
| 2 | (X2,Y2) | (x2,y2,z2) |

FIG. 11
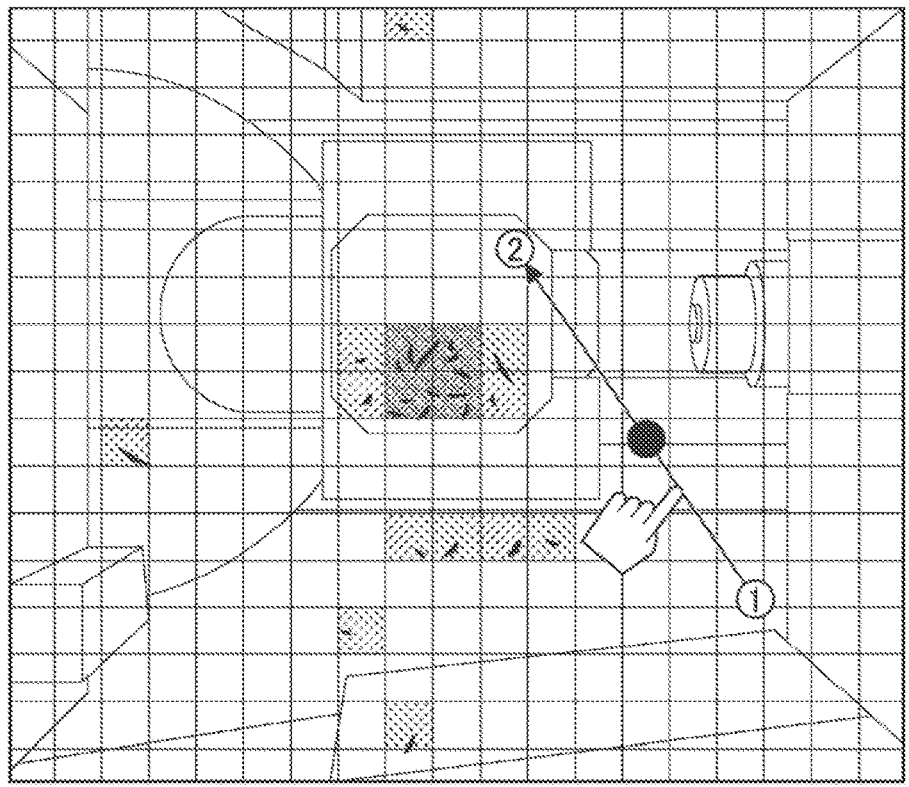
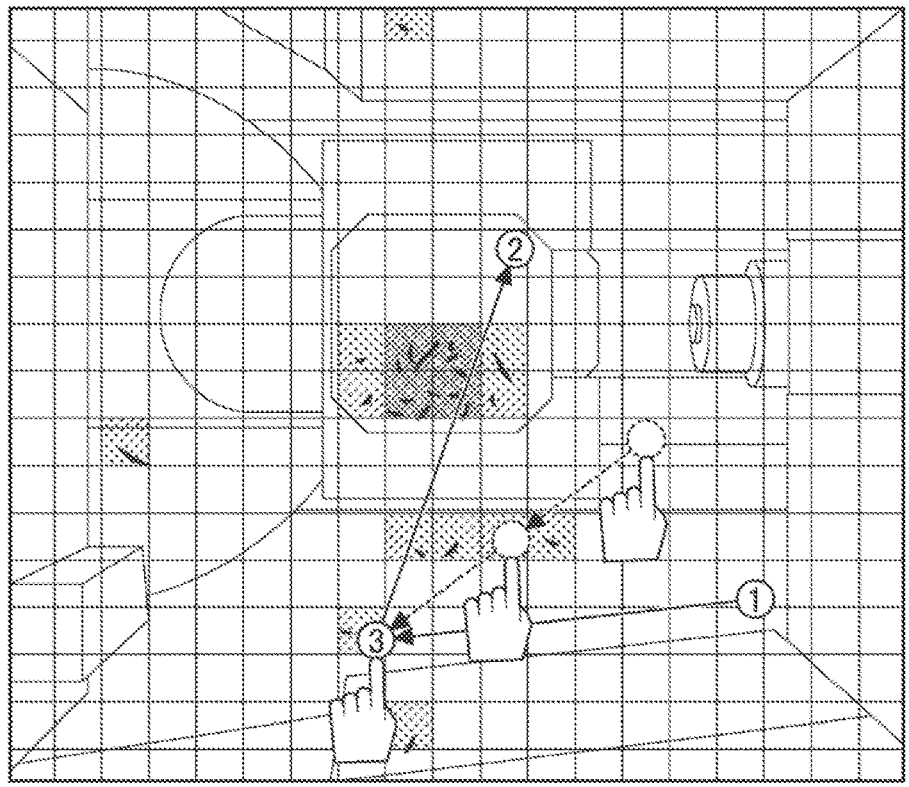

FIG. 12
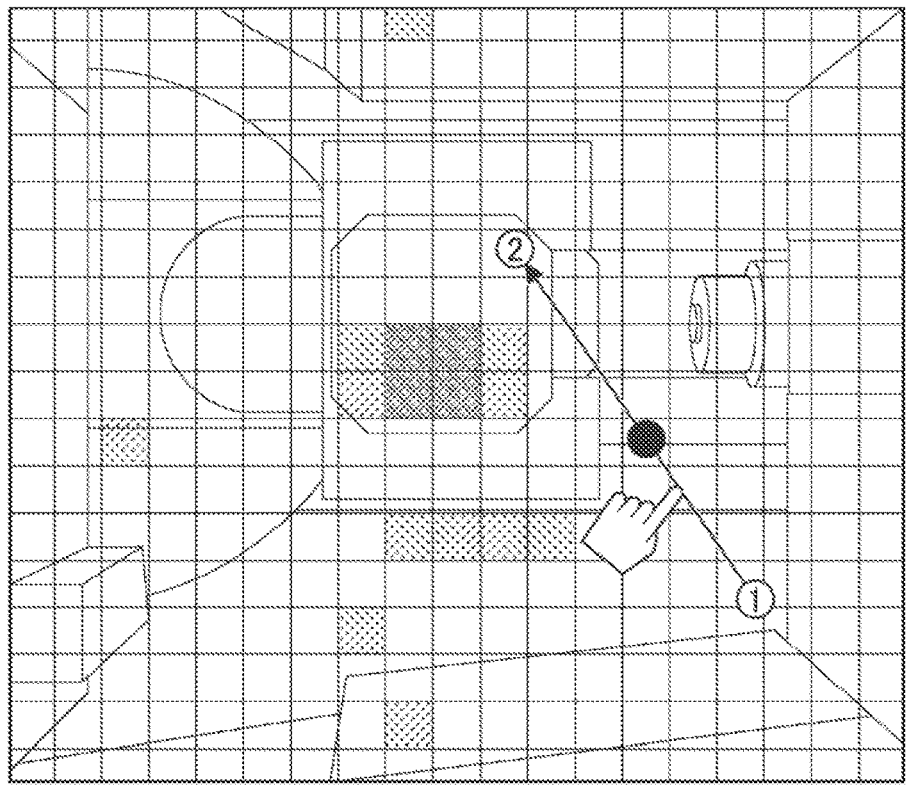
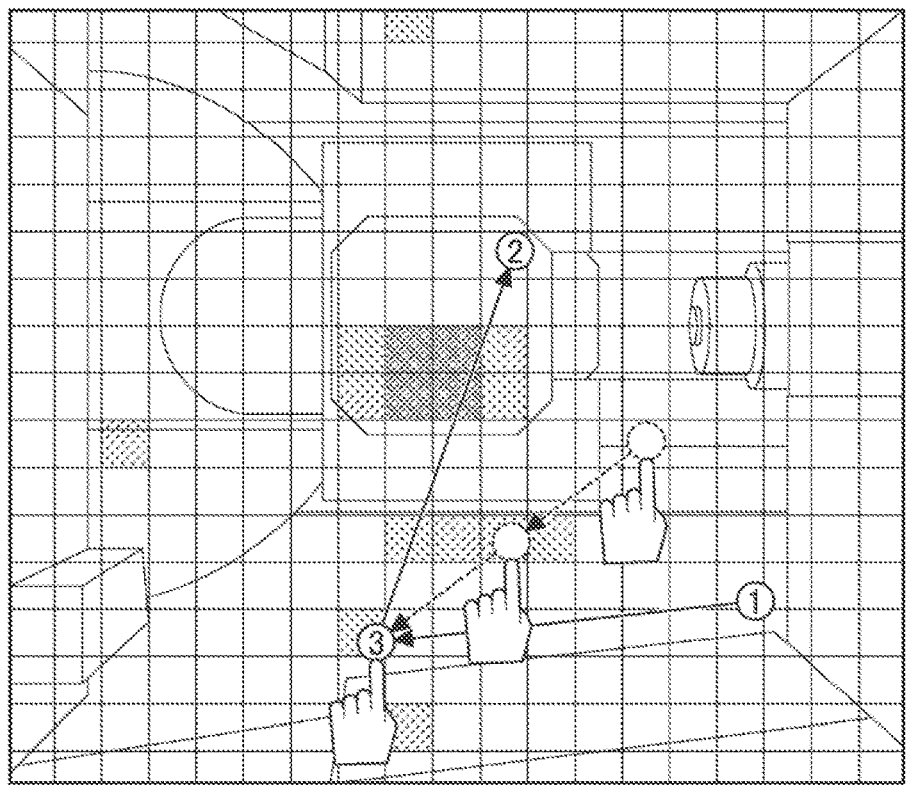

FIG. 13
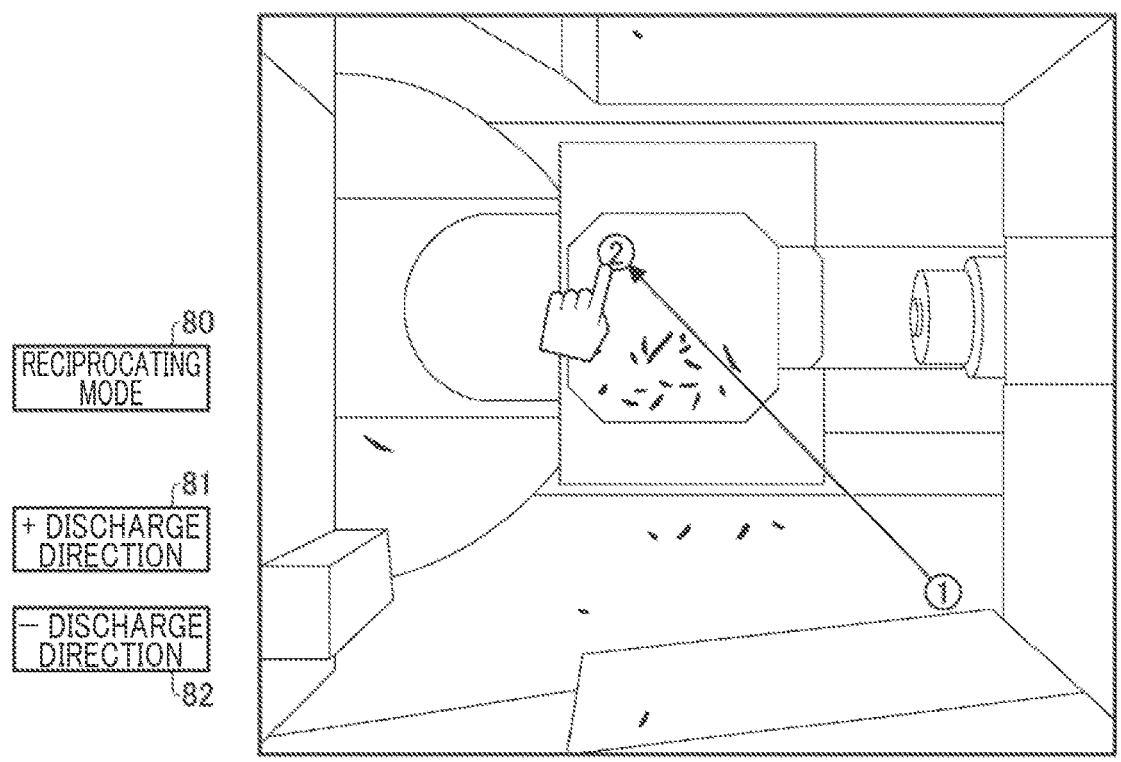
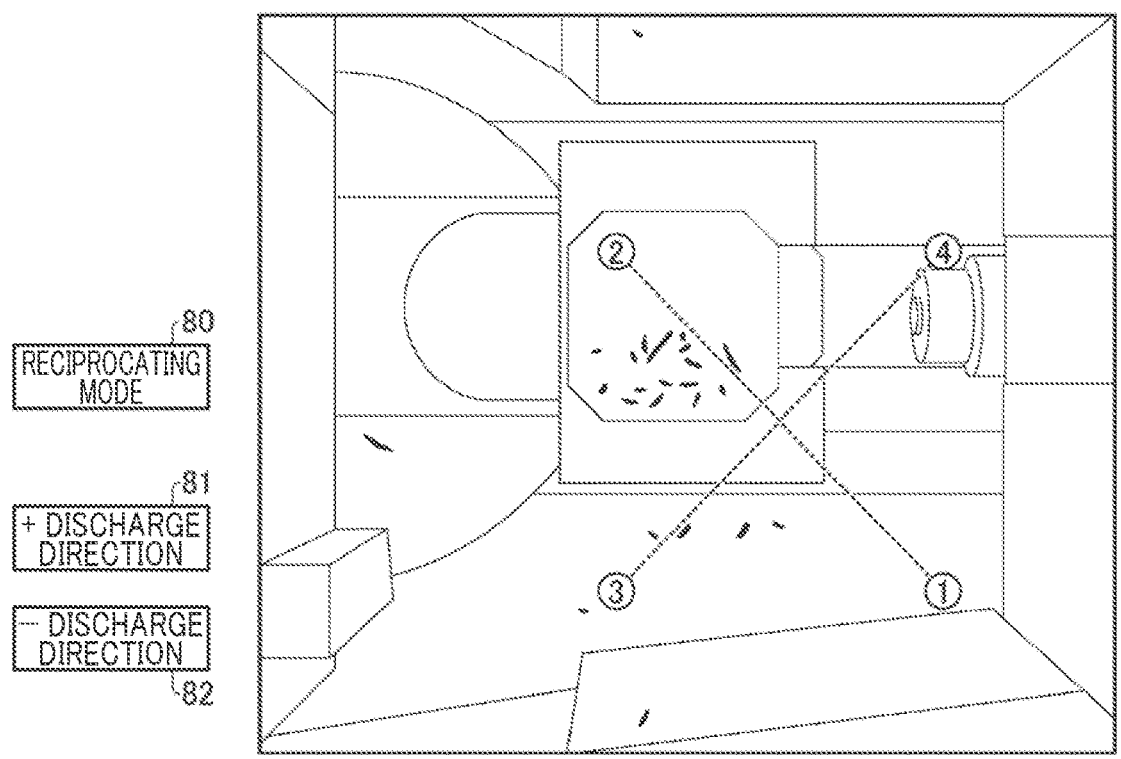

FIG. 15
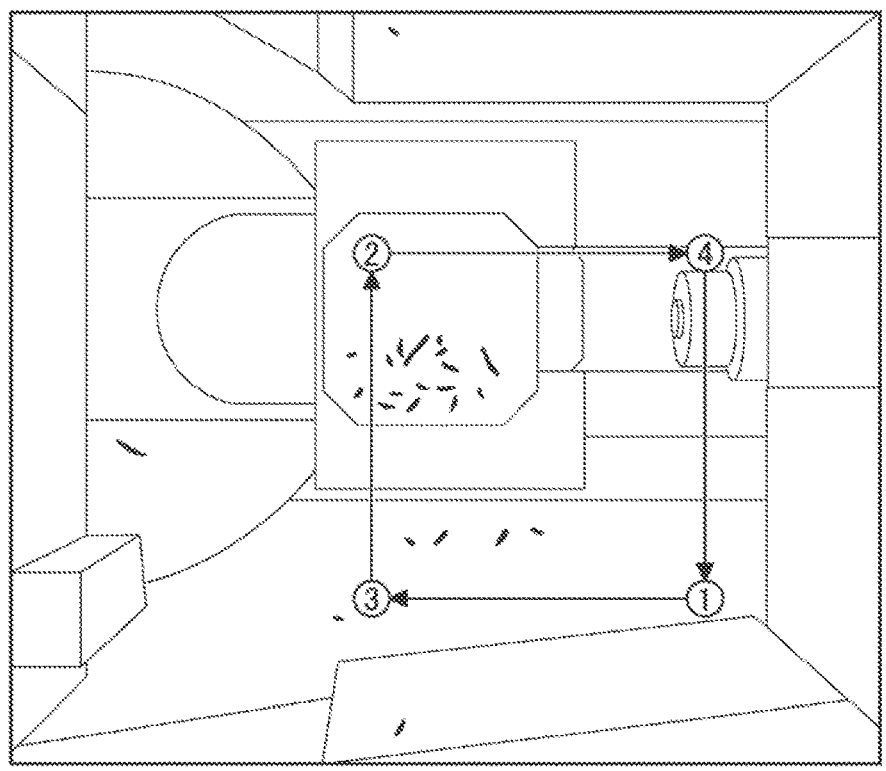
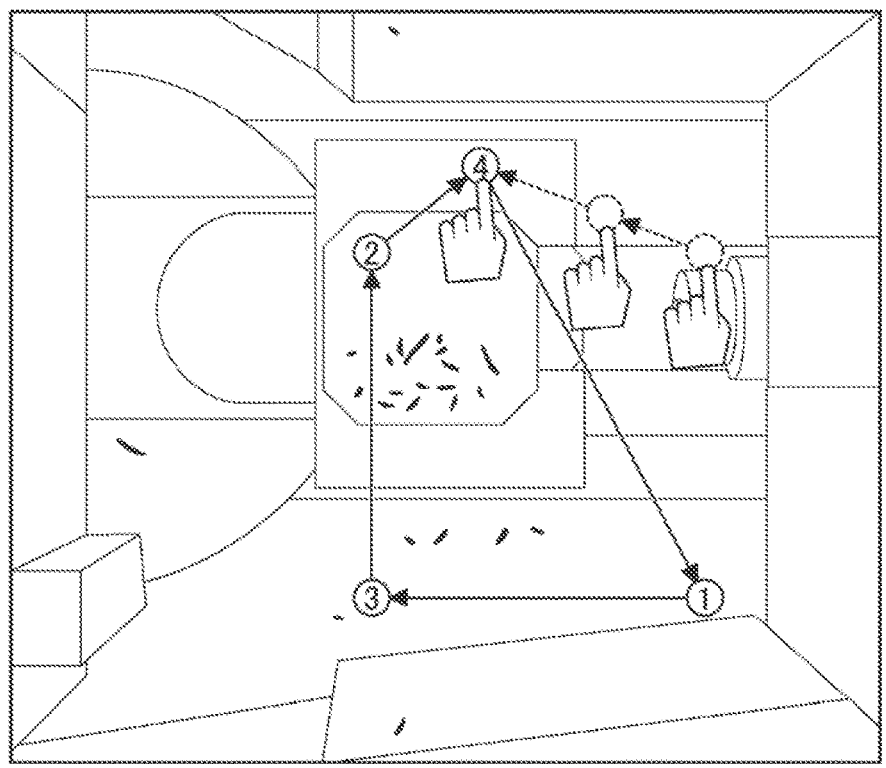

FIG. 16
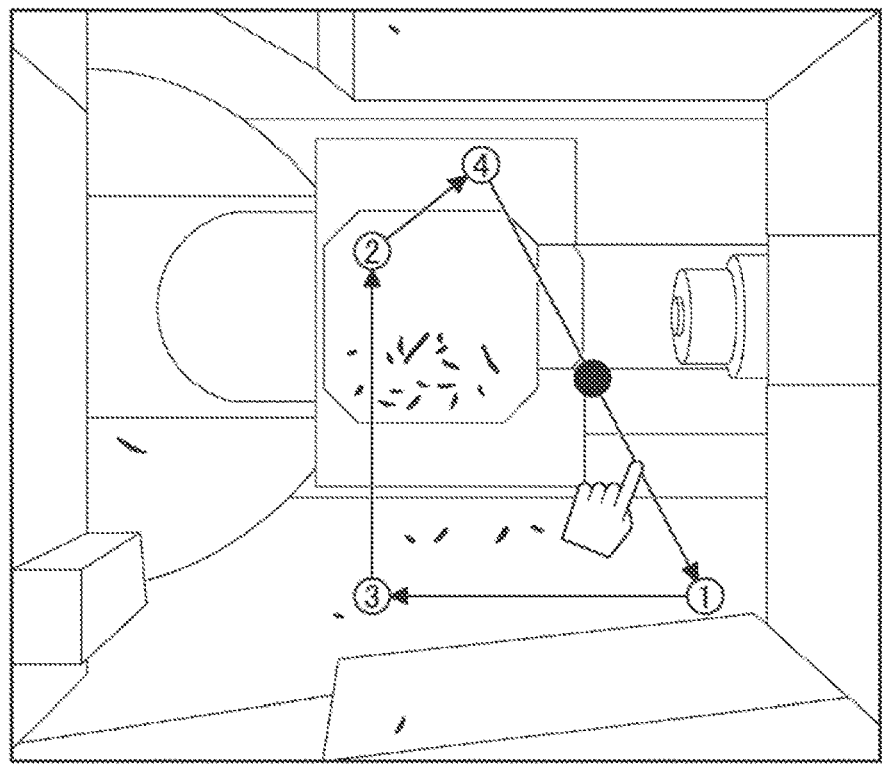
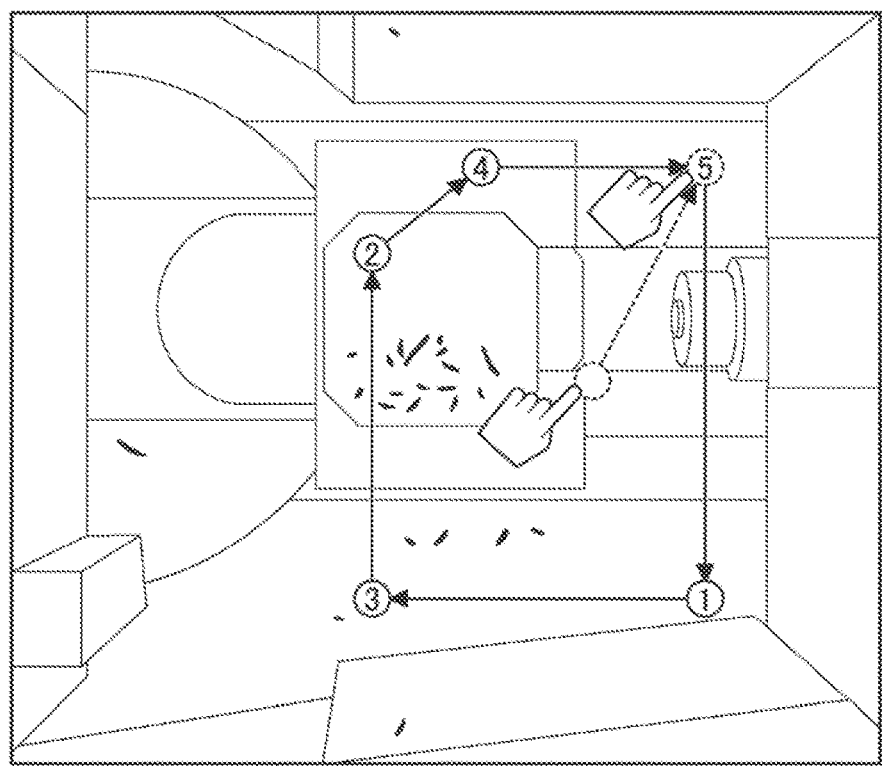

FIG. 17
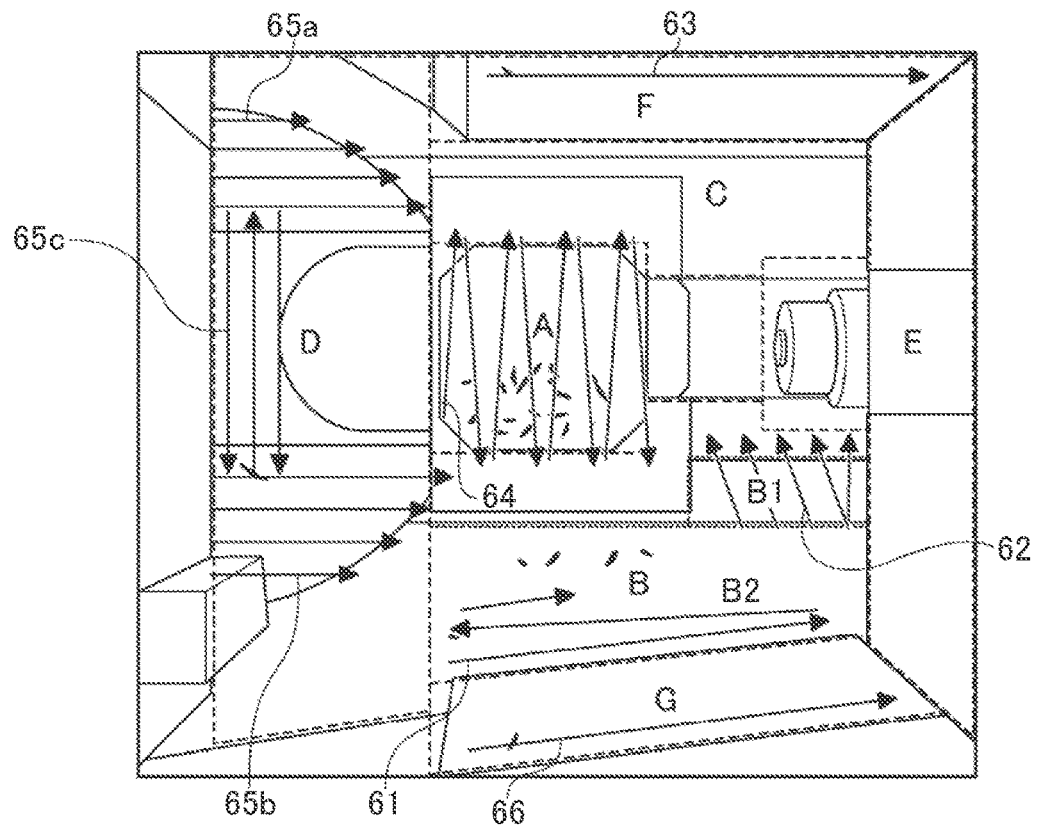
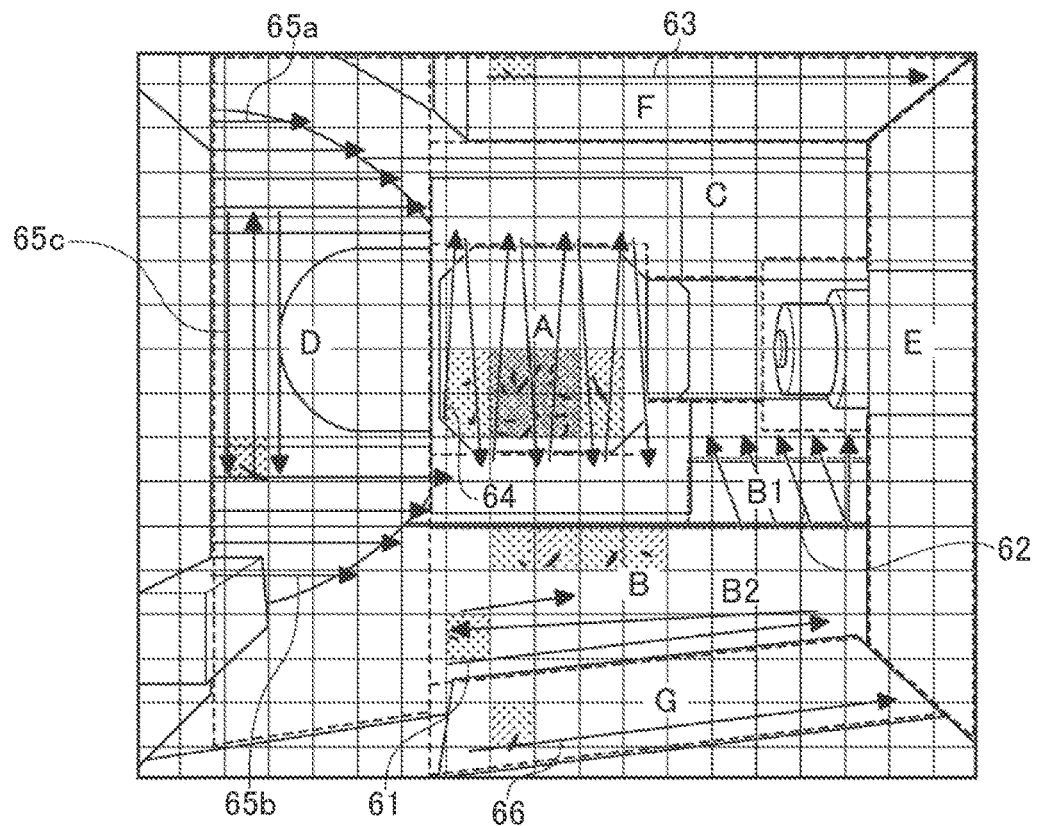

FIG. 18
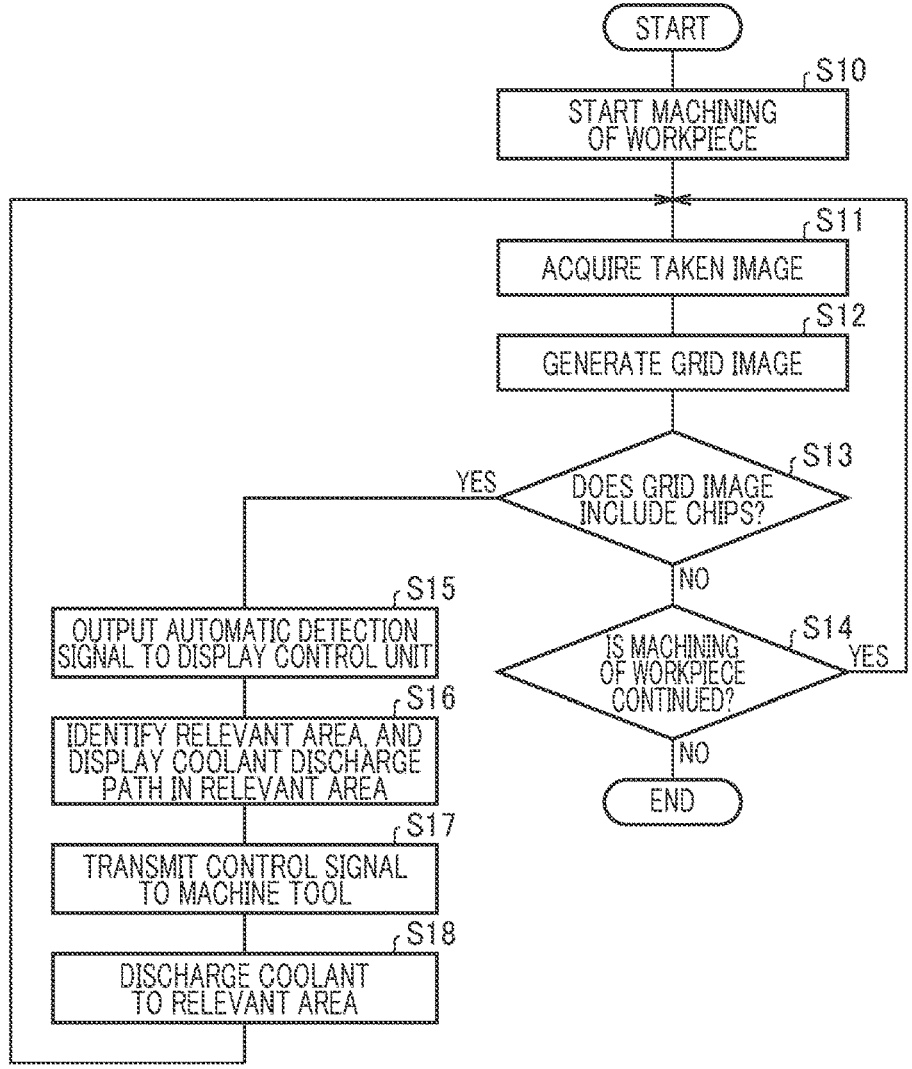
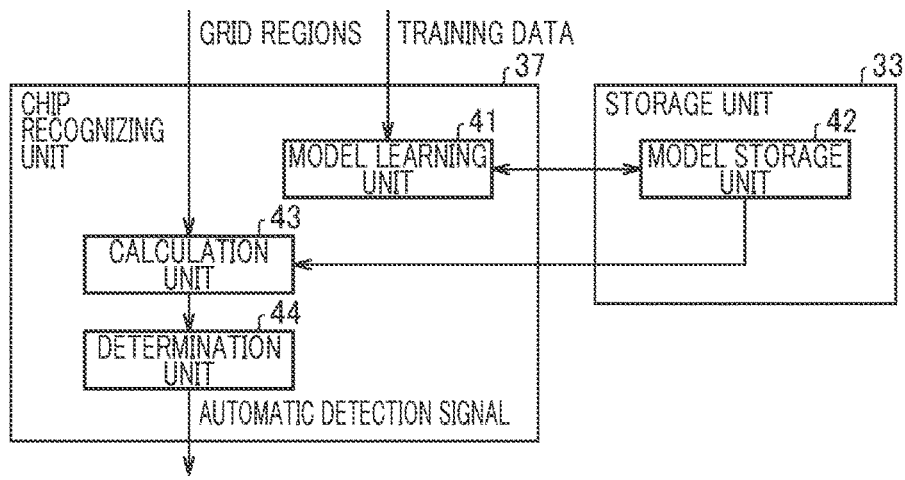

FIG. 23
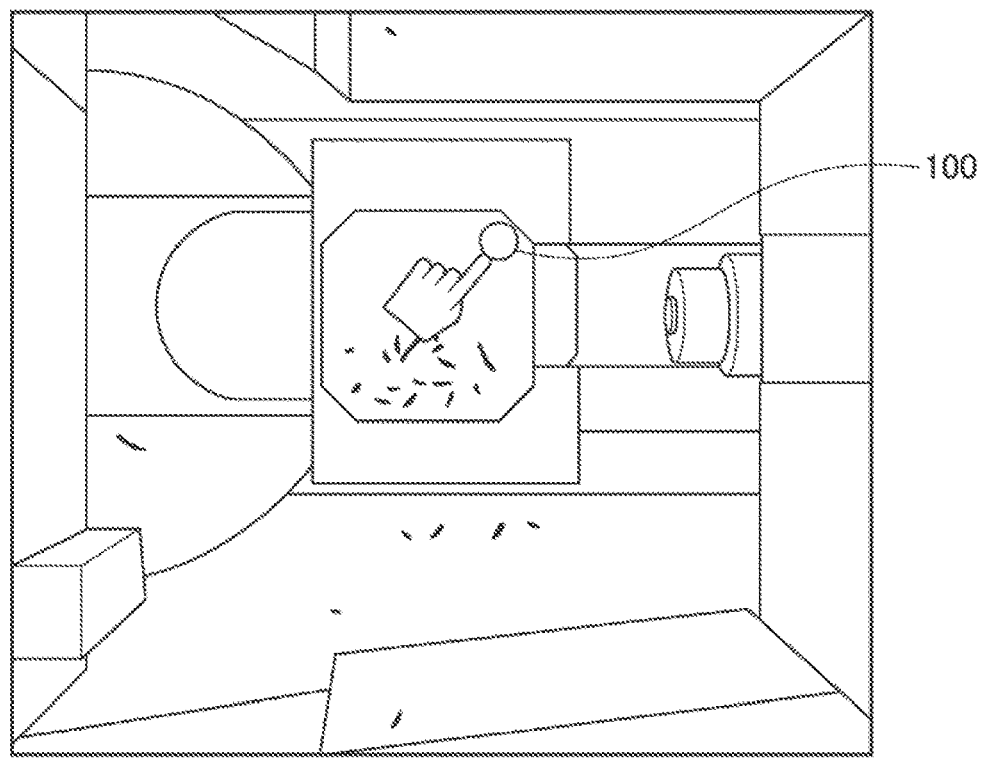
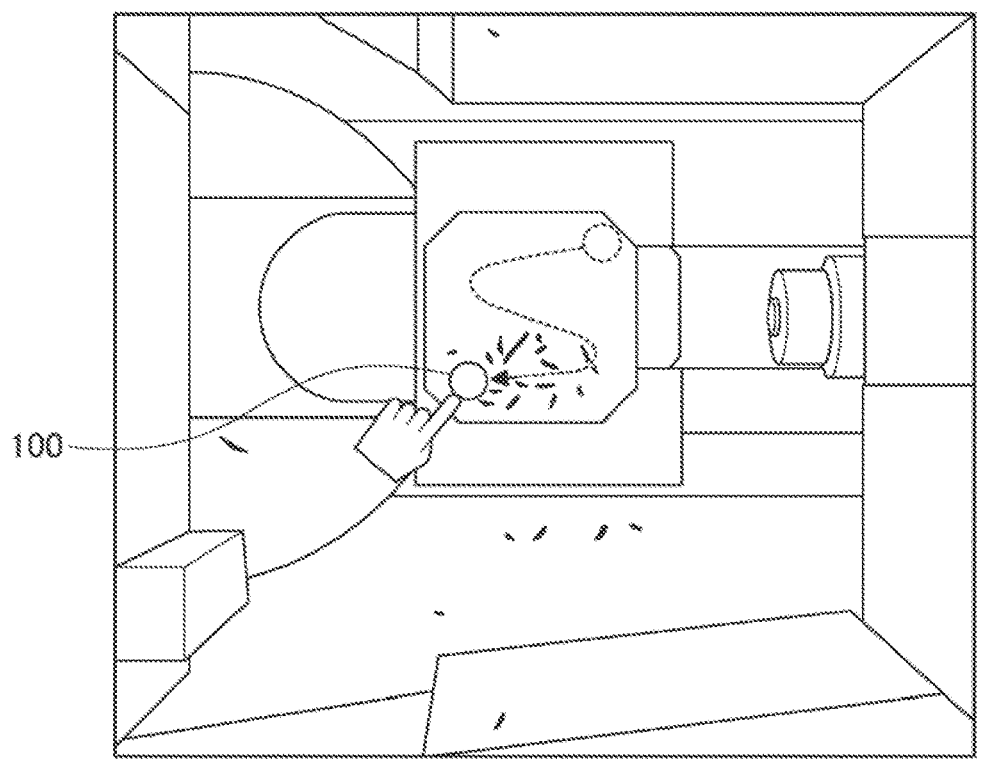

FIG. 24
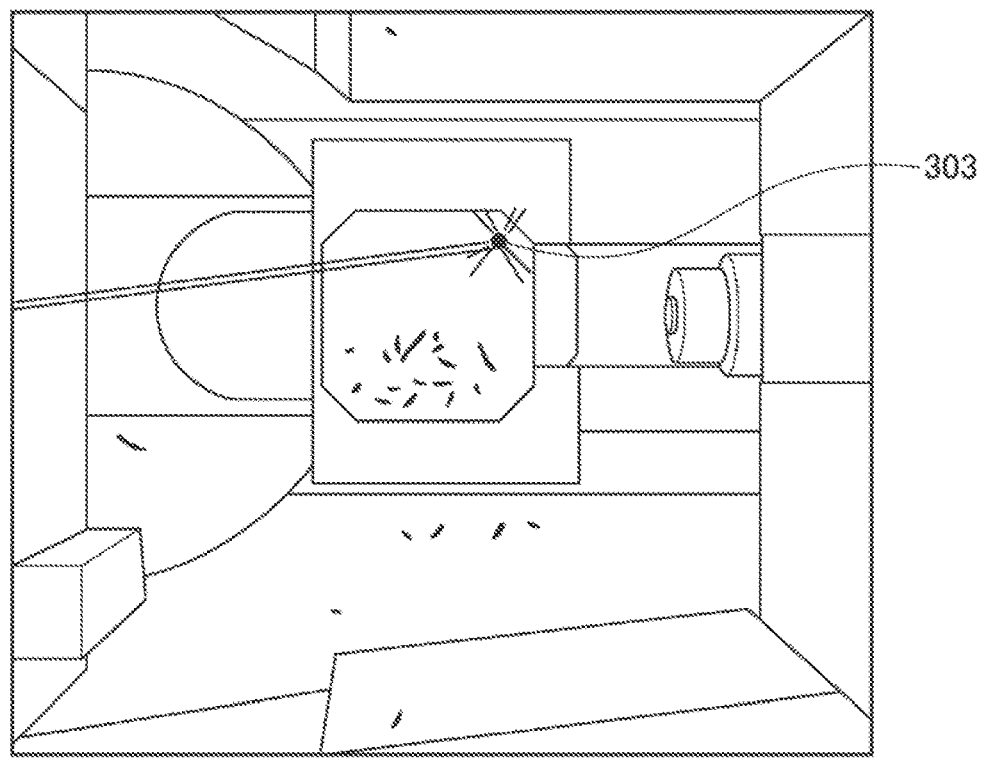
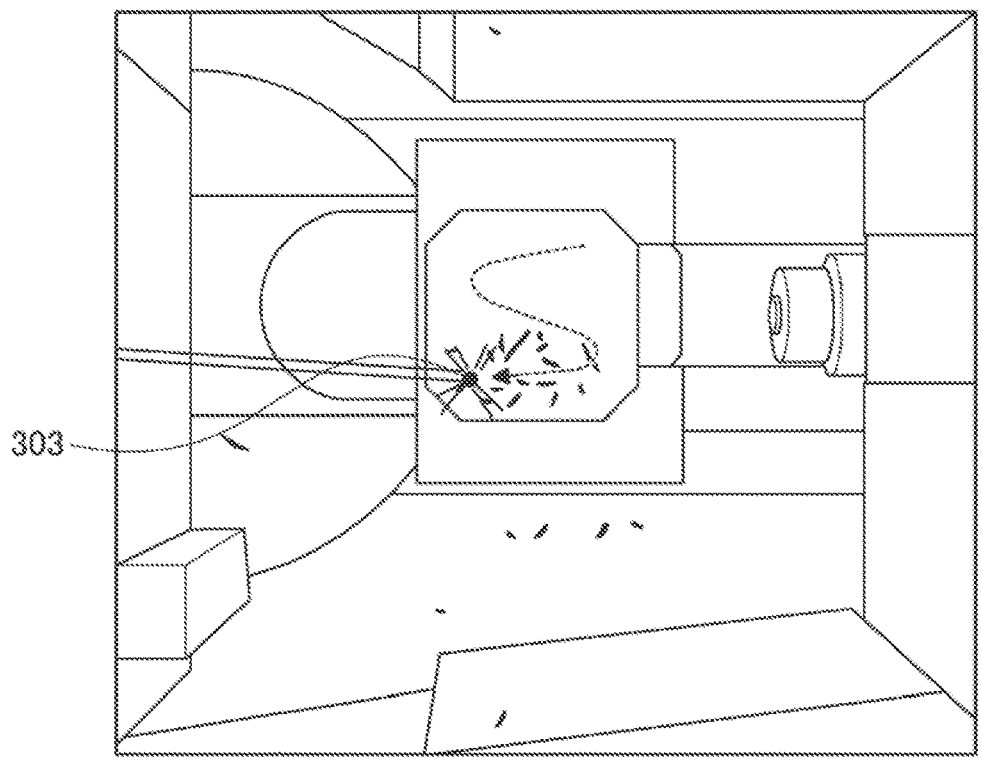

FIG. 26
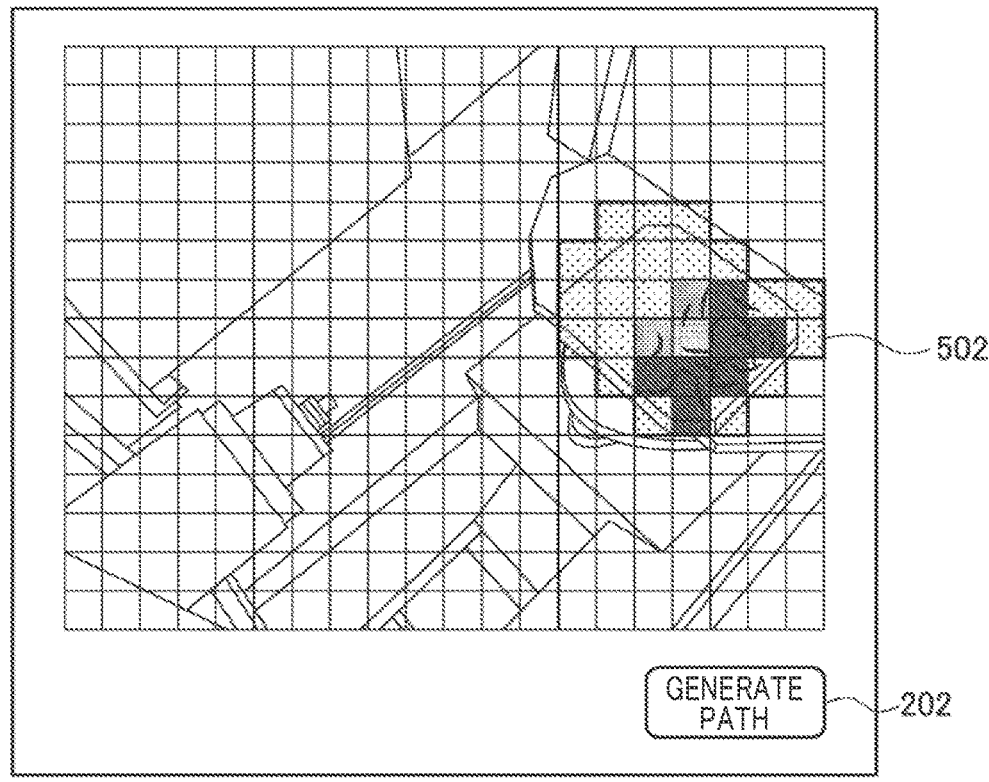
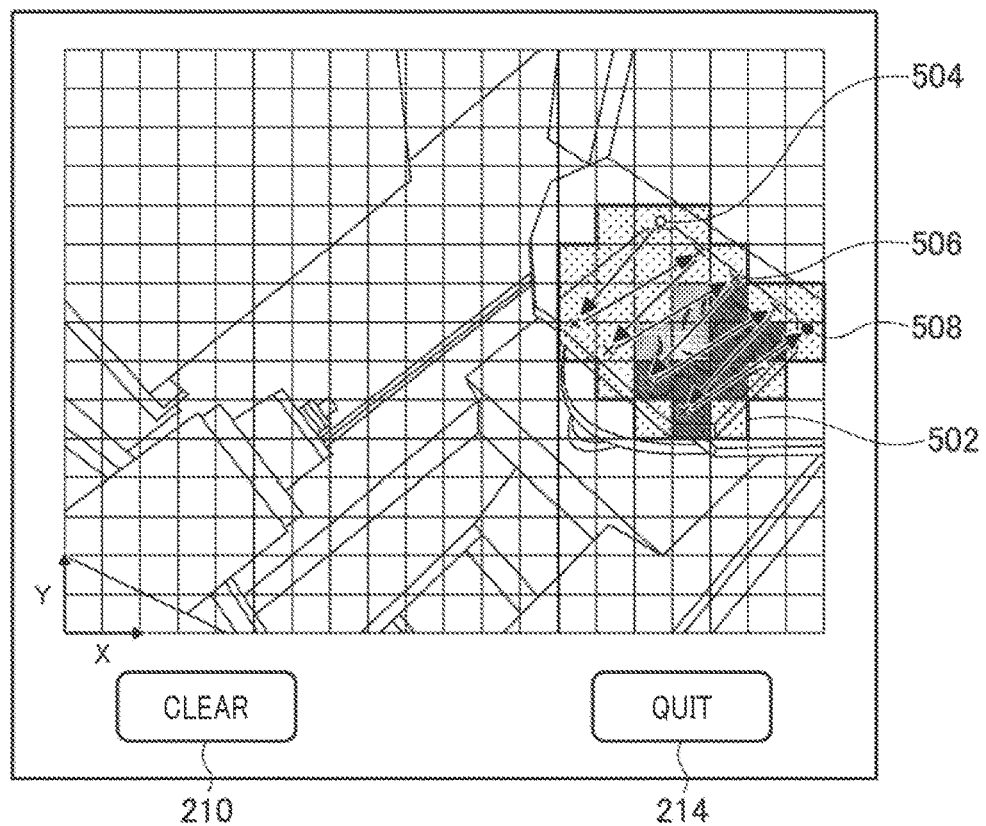

INFORMATION PROCESSING DEVICE, AND PROGRAM

BACKGROUND OF INVENTION

1. Field

The present disclosure relates to an information processing device for generating a fluid discharge path for discharging fluid to move chips in a machine tool.

2. Description of Related Art

In machining of a workpiece, which is an object to be machined, in a machine tool, chips are produced. Accumulation of a large volume of chips makes machining difficult to continue. The operation of a machine tool therefore needs to be periodically stopped, and an operator needs to remove chips by using air blows or the like, which lowers the operational efficiency of the machine tool. Thus, removal of chips needs to be performed without manual work.

As such technology, Patent Literature 1 teaches a machine tool that captures a template image of the inside of a machine tool in advance, compares an image thereof taken after machining of workpieces with the template image, determines regions from which chip removal is needed on the basis of a difference in luminance between the images, and discharges liquid to remove chips.

In addition, Patent Literature 2 teaches a chip removing device that captures images of a table and a workpiece to detect a location of chips.

Related Art List

Patent Literature 1: JP 2016-120589 A
Patent Literature 2: JP H07-108435 A

In Patent Literature 1, however, differences in the state inside the machine tool between before and after machining include differences other than that of chips (such as a coolant discharged during machining, for example), but are not considered. In addition, the detected luminance also varies depending on the external environment such as daytime and night time. Thus, when it is attempted to determine the location of chips on the basis of the differences in the state inside the machine tool between before and after machining as described in Patent Literature 1, it is necessary to generate a template image and define appropriate thresholds of luminance for each workpiece, and a large amount of control processing is therefore necessary to determine a liquid discharge path.

In addition, when it is attempted to detect chips on the basis of an image according to Patent Literature 2, various combinations of many kinds of chips and environments in the machine tool are captured in the image in a complex manner. Massive amounts of calculation and time are therefore necessary for image processing.

SUMMARY

The present disclosure therefore aims at providing a technology that enables a fluid discharge path for efficiently moving chips to be easily generated.

Thus, the present disclosure provides a technology according to the claims.

According to the present disclosure, a fluid discharge path for efficiently moving chips can be easily generated.

BRIEF DESCRIPTION OF DRAWINGS

FIG. 2 illustrates an example of a schematic taken image of the inside of a machine tool and grid regions;

FIG. 3 illustrates an example of display of a coolant discharge path in automated cleaning, and an example of display in a process of generating a coolant discharge path in instructed cleaning;

FIG. 4 illustrates an example of display in a process of generating a coolant discharge path in instructed cleaning;

FIG. 5 illustrates an example of display in a process of generating a coolant discharge path in instructed cleaning;

FIG. 6 illustrates an example of display in a process of generating a coolant discharge path in instructed cleaning;

FIG. 7 illustrates examples of a discharge path table;

FIG. 11 illustrates an example of display in a process of generating a coolant discharge path in instructed cleaning;

FIG. 12 illustrates an example of display in a process of generating a coolant discharge path in instructed cleaning;

FIG. 13 illustrates an example of display in a process of generating a coolant discharge path in instructed cleaning;

FIG. 15 illustrates an example of display in a process of generating a coolant discharge path in instructed cleaning;

FIG. 16 illustrates an example of display in a process of generating a coolant discharge path in instructed cleaning;

FIG. 17 illustrates an example of a cleaning path pattern in automated cleaning;

FIG. 18 illustrates a flowchart for explaining control processes in automated cleaning and a configuration of a chip recognizing unit;

FIG. 23 is a diagram of a screen for specifying a coolant discharge path in a manual cleaning mode;

FIG. 24 is a diagram of a screen showing a coolant discharge state in a manual cleaning mode;

FIG. 26 is diagram of a screen showing a coolant discharge path in an area cleaning mode.

DETAILED DESCRIPTION

An embodiment of the present disclosure will now be described with reference to the drawings.

Figure 1:
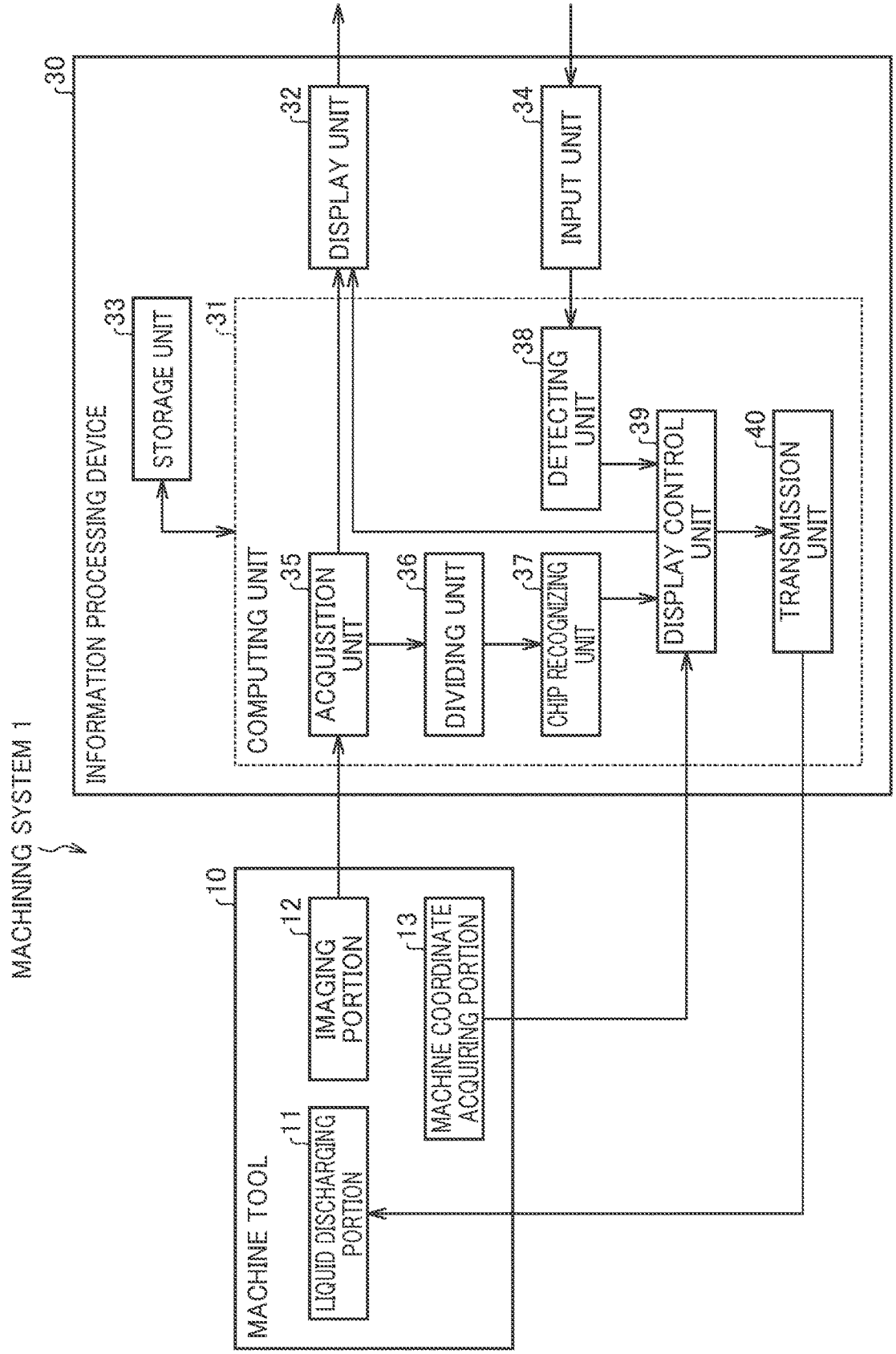
FIG. 1 is a functional block diagram of a machining system.

FIG. 1 is a functional block diagram of a machining system 1 according to the present embodiment. The machining system 1 includes a machine tool 10 and an information processing device 30. The components of the machine tool 10 and the information processing device 30 constituting the machining system 1 are implemented by hardware including computing units such as central processing units (CPUs) and various co-processors, storage devices such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs. The blocks explained with reference to FIG. 1 do not represent configurations in units of hardware but represent blocks in units of functions.

The machine tool 10 is equipment for machining, such as cutting and grinding, of a workpiece to be machined, which is conveyed into the machine tool 10. The machine tool 10 is a machine (machining center) that includes a tool mounted on a spindle to machine a workpiece, a machine (turning center) that includes a plurality of tools mounted on a turret, to machine a workpiece while turning the workpiece, a machine for additive machining in which machining is performed by melting a material (metal powder, for example) by a laser, and a combined machine including these functions in combination. While a workpiece is machined, portions of the workpiece are separated into shavings and accumulate inside the machine tool 10. Shavings are an example of "chips produced during machining of a workpiece". In addition, residual metal powder that has not been used for a workpiece in a machine for additive machining using metal powder is also an example of "chips produced during machining of a workpiece". The "information processing device" may be an operation panel itself of the machine tool, or a device other than the operation panel. The information processing device 30 generates a fluid discharge path for discharging fluid (jets of fluid) in the machine tool 10 to move chips. The fluid discharged into the machine tool 10 may be liquid such as a lubricating liquid or a liquid coolant, or gas such as air.

<Machining System 1>

The machining system of the present embodiment will be described with reference to an example in which liquid that is a liquid coolant is used as the fluid. Chips in the following example may be shavings, for example.

The machine tool 10 includes a liquid discharging portion 11, an imaging portion 12, and a machine coordinate acquiring portion 13. The liquid discharging portion 11 discharges liquid to move chips. The liquid discharging portion 11 includes a nozzle capable of discharging liquid, an actuator for driving the nozzle, and a pump for pumping up liquid from a liquid reservoir portion in which the liquid is stored, for example. Liquid is discharged from the nozzle toward chips to move the chips onto a chip conveyor or the like outside a machining area, so that the chips can be removed from the machining area in the end. For this liquid, a coolant for cooling and lubricating a workpiece and a spindle and the like of machining equipment, which generate heat during machining, may be used, or other liquid may be used. Herein, a case where coolant is used as the liquid for moving chips will hereinafter be described. The coolant is an example of the "fluid discharged into the machine tool". The coolant is discharged along a discharge path to move chips. In the liquid discharging portion 11, the position of the nozzle, the direction in which the coolant is discharged from the nozzle, the discharge pressure of the coolant, and the like can be changed. The liquid discharging portion 11 preferably includes a plurality of nozzles. This is because one liquid discharge area from one nozzle does not cover spatial areas that are blocked by components of the machine tool 10. If chips enter the spatial areas, the flow of liquid from the nozzle cannot sufficiently reach the chips, and it is therefore difficult to move the chips. Alternatively, a gas discharging portion for discharging gas to move chips may be provided instead of the liquid discharging portion 11. The gas discharging portion includes a nozzle capable of discharging gas, an actuator for driving the nozzle, and a pump for compressing gas (air, for example). The liquid discharging portion 11 is controlled in a manner similar to the liquid discharging portion 11.

The imaging portion 12 images a target area in the machine tool 10 in which chips produced during machining of a workpiece are to be detected. A "target area in the machine tool" is a range in which chips produced during machining of a workpiece are expected to be present. The imaging portion 12 is to image a wide range in a machining chamber (including an horizontal plane and side faces thereof) as will be explained with reference to an upper image in FIG. 2, and is not to image individual chips. The imaging portion 12 performs imaging with a wider angle of view than a case of imaging individual chips. An image of a wide-range area in the machining chamber shows a state of chip distribution, that is, an uncleaned state.

The imaging portion 12 is a camera including an image sensor such as a CCD or a CMOS, for example, and is capable of imaging the inside of the machine tool 10. The imaging portion 12 can output an image obtained by imaging to the information processing device 30, which will be described later. The machine tool 10 may include a plurality of imaging portions 12 depending on the performances and the imaging ranges of the imaging portions 12. The machine tool 10 in the present embodiment includes two imaging portions 12. In this case as well, one imaging portion is positioned so as to capture an area that cannot be captured by the other imaging portion, which enables the entire machining area in the machine tool 10 to be checked in the images obtained by imaging by the imaging portions.

The machine coordinate acquiring portion 13 can acquire machine coordinates expressing the positions in the machine tool 10 of movable components, such as a pallet 14 and a spindle 22, in the structure of the machine tool 10. Details of the movable components will be described later. The acquire machine coordinates can be transmitted to a display control unit 39 of the information processing device 30, which will be described later. For the machine coordinates, position information for machining transmitted from an NC control device to the machine tool 10 can be used. Alternatively, position information acquired with use of sensors can be used.

The information processing device 30 includes a computing unit 31 for processing an image taken by the imaging portions 12 of the machine tool 10, and transmitting a signal to the machine tool 10, a display unit 32 for displaying an image taken by the imaging portions 12, a storage unit 33 for storing images to be processed by the computing unit 31 and information such as positions as necessary, and an input unit 34 for outputting an input signal to the computing unit 31. The information processing device 30 is a device, such as a computer or a tablet, that has functions of receiving and displaying images, for example. An image taken by the imaging portions 12 is an example of "an image of the inside of the machine tool". The image may be video, a static image, or a drawing that reproduces the structure of the machine tool.

The display unit 32 is a display of a computer, for example, capable of displaying an image taken by the imaging portions 12 of the machine tool 10 and output to the information processing device 30. The display unit 32 may also display an image obtained by processing a taken image by the computing unit 31, such as a taken image with a grid generated by a dividing unit 36, which will be described later, for example. In addition, information on whether chips are present, the volume of chips, and the like, for example, can be displayed in a grid region of the grid. The display unit 32 may be a so-called touch panel, such as a resistive or capacitive display, which enables an operator to directly input instructions based on a displayed image by touching the image, for example.

The input unit 34 is a mouse, which is a typical input device for a computer, for example. The operator can input certain instructions such as position information to the information processing device 30 by using the input unit 34. In the case of a touch panel, a mechanism for detecting a position touched by the operator, which is part of the display described above, corresponds to the input unit 34 (and a detecting unit 38, which will be described later). The input unit 34 outputs the instructions in the form of input signals to the detecting unit 38.

The computing unit 31 includes an acquisition unit 35, the dividing unit 36, a chip recognizing unit 37, the detecting unit 38, the display control unit 39, and a transmission unit 40. The computing unit 31 and the respective processing units 35 to 40 included in the computing unit 31 include a general-purpose processor such as a CPU or an MPU for executing programs to implement predetermined functions. The computing unit 31 and the respective processing units 35 to 40 included in the computing unit 31 call and execute control programs stored in the storage unit 33, for example, to implement various processes in the information processing device 30. The computing unit 31 and the respective processing units 35 to 40 included in the computing unit 31 are not limited to combination of hardware and software that cooperate to implement the functions, and may be dedicated hardware circuits designed to implement the functions. Specifically, the computing unit 31 and the respective processing units 35 to 40 included in the computing unit 31 can be implemented by various processors such as a CPU, an MPU, a GPU, a FPGA, a DSP, and an ASIC.

The acquisition unit 35 acquires an image taken by the imaging portions 12, and outputs the image to the display unit 32 or the dividing unit 36.

The dividing unit 36 can divide at least part of an image taken by the imaging portions 12 into a plurality of grid regions. Grid regions are regions of a predetermined geometric pattern (grid) into which a taken image is divided. In a lower image in FIG. 2, an image obtained by imaging of the inside of the machine tool 10 is divided into square grid regions. Such an image constituted by a plurality of grid regions can be referred to as a grid image. The shapes and the sizes of grid regions may be changed as necessary. Such division into grid regions allows an operator to easily indicate a position. Note that a grid image herein is not limited to an image obtained by adding the information of a grid to a taken image, and may be an association of a taken image with a grid. In other words, a taken image and a grid saved as separate data are also referred to as a grid image. Grid regions are output to the display unit 32 and the detecting unit 38. The machining system 1 may have a configuration without the dividing unit 36, and in this case, a taken image acquired by the acquisition unit 35 is output to the display unit 32 and the detecting unit 38. Note that, in this example, a lower-left end of the image corresponds to an origin, a lateral direction corresponds to an X axis, a rightward direction corresponds to a positive direction of the X coordinate, a vertical direction corresponds to a Y axis, and an upward direction corresponds to a positive direction of the Y coordinate.

The chip recognizing unit 37, details of which will be described later, automatically recognizes chips on the basis of the grid regions generated from a taken image by the dividing unit 36, and determines whether or not chips are present and the volume of chips that is present in each grid region. If it is determined that chips are present in a grid region, the chip recognizing unit 37 recognizes a position in the taken image corresponding to the grid region in the grid image as a chip accumulating position. Upon recognizing the chip accumulating position, the chip recognizing unit 37 outputs an automatic detection signal to the display control unit 39. An automatic detection signal includes at least information on a position in a taken image at which chip accumulation is recognized.

The detecting unit 38 receives a signal including position information output from the input unit 34 in response to an operation performed by an operator on the input unit 34 on the basis of an image displayed on the display unit 32. The detecting unit 38 can thus detect the chip accumulation state at the position indicated by the operator on the input unit 34 on the basis of the image taken by the imaging portions 12. In a case where a plurality of indicated positions are provided, the detecting unit 38 detects a plurality of input signals, which number corresponds to the number of the indicated positions. For example, in a case where two indicated positions are present, the detecting unit 38 detects a first input signal for a first indicated position, and a second input signal for a second indicated position. The detecting unit 38 may detect an indicated position based on a grid region generated by the dividing unit 36.

In an automated cleaning mode, the display control unit 39 sets a position to which coolant is to be discharged on the basis of an automatic detection signal. The display control unit 39 acquires a position in a taken image on the basis of an automatic detection signal output from the chip recognizing unit 37 or the detecting unit 38 to acquire a relevant area including the position at which chips have accumulated (an area in which the chip volume has exceeded a threshold) inside the machine tool 10. The display control unit 39 sets a predetermined coolant discharge path, details of which will be described later, depending on the relevant area. The display control unit 39 causes the predetermined coolant discharge path to be displayed on the display unit 32. The transmission unit 40 transmits, to the liquid discharging portion 11, a control signal including at least information for discharging coolant to the relevant area on the basis of the set coolant discharge path. In this manner, the liquid discharging portion 11 can be controlled on the basis of an automatic detection signal. Thus, recognition or input of a position can cause control of the liquid discharging portion 11 to discharge coolant to move chips.

In an instructed cleaning mode, the display control unit 39 generates a coolant discharge path in a target area on the basis of a plurality of indicated positions (a first indicated position and a second indicated position, for example), and generates a control signal. The control signal is a signal for controlling discharge of coolant on the basis of the discharge path.

The transmission unit 40 outputs a coolant discharging signal to the liquid discharging portion 11. The discharging signal is a signal for discharging coolant toward a relevant area associated with an indicated position at which chips are present to move the chips. In response to the discharging signal, the nozzle of the liquid discharging portion 11 of the machine tool 10 discharges coolant toward the relevant area by a predetermined cleaning method. In a case where the machine tool 10 and the information processing device 30 are integrated, the machining system 1 can alternatively have a configuration in which the transmission unit 40 is not included and the display control unit 39 outputs a signal directly to the liquid discharging portion 11.

The storage unit 33 is a recording medium having various information recorded therein. The storage unit 33 is constituted by a DRAM, an SRAM, a flash memory, an MRAM, an ReRAM, an FeRAM, an SSD (solid state device), a hard disk, other storage devices, or a combination thereof as appropriate, for example. The storage unit 33 can store a taken image acquired by the acquisition unit 35, grid regions (a grid image) generated by the dividing unit 36, information on a position at which the presence of chips is recognized by the chip recognizing unit 37, information on a chip volume, information on the position detected by the detecting unit 38, information on the association between the position and the relevant area, and the like. In addition, the respective processing units of the computing unit 31 can read images and information stored in the storage unit 33 where necessary. Herein, configurations of the respective processing units in which an image or information is directly input from a processing unit to another processing unit, and an image processed or information generated by the processing unit is directly output to another processing unit are described. The respective processing units of the computing unit 31, however, are not limited thereto, and may each read an image or information from the storage unit 33 in image processing or upon signal detection, and may each store an image on which image processing is performed or information generated by the processing unit into the storage unit 33.

An upper image in FIG. 2 corresponds to an image obtained by imaging the inside of the machine tool 10, and illustrates the pallet 14, a revolving door 17, a side face 18a, a side face 18b, a slope face 19, a flat face 20, a shooter 21, the spindle 22, a central part 24, a side part 26a, and a side part 26b. In the present embodiment, a rotation axis of the spindle 22 illustrated in the upper image of FIG. 2 is assumed to be along the front-back direction inside the machine tool 10, the base side of the spindle 22 corresponds to a near side, and the distal side thereof corresponds to a far side. In addition, a horizontal direction perpendicular to the rotation axis corresponds to the left-right direction, and a vertical direction perpendicular to the rotation axis corresponds to the up-down direction.

The pallet 14 is a table on which a workpiece is to be placed and fixed. The machine tool 10 can include a plurality of pallets 14. In this case, changing of a workpiece to be machined can be made by changing the pallet 14, which can improve time efficiency.

The revolving door 17 is a door that is rotatable around a central axis. For changing the pallet 14, the revolving door 17 is turned.

The side face 18b is a wall, of the machine tool 10, which can be opened and closed. The side face 18b separates the inside of the machine tool 10 from the outside thereof. When the side face 18b is opened, an operator can enter the inside of the machine tool 10. In addition, side face 18a at a position opposite the side face 18b separates the inside of the machine tool 10 from a tool storage portion. The tool storage portion stores a plurality of tools. In machining, the side face 18a opens and a tool mounted on the spindle 22 can be replaced with another tool stored in the tool storage portion where necessary.

The shooter 21 is a place into which the chips flow during cleaning. The slope face 19 is inclined downward toward the shooter 21 to facilitate the flow of chips toward the shooter 21.

The spindle 22 can rotate a tool mounted on the leading end thereof around the rotation axis to machine a workpiece. In the present embodiment, as illustrated in the upper image in FIG. 2, the spindle 22 has a columnar external shape.

<Generation of Coolant Discharge Path>

A method for generating a coolant discharge path will be explained with reference to FIGS. 3 to 20.

An upper screen in FIG. 3 illustrates an example of the display unit 32 of the machining system 1. The display unit 32 includes a screen area 50 on which a taken image or a grid image is displayed, a mode selection area 51, a first image selection area 52, and a second image selection area 53. The selection areas 51 to 53 each include regions (selecting regions) for selecting a cleaning method or an image to be displayed on the screen area 50. When an operator indicates a selecting region (touches a selecting region on the display unit 32 in a case where the display unit 32 is a touch panel, for example), this operation is detected by the detecting unit 38, and the indicated cleaning method or image is selected. The mode selection area 51 includes an automated cleaning mode selecting region 54 and an instructed cleaning mode selecting region 55. The automated cleaning mode selecting region 54 or the instructed cleaning mode selecting region 55 can be selected to change the cleaning mode to the automated cleaning mode or the instructed cleaning mode.

In the present embodiment, the first image selection area 52 presents an image indicating a first coolant discharge direction of the liquid discharging portion 11 as viewed from one of the two imaging portions 12. This imaging portion 12 images the inside of the machining chamber from above. The first image selection area 52 includes a taken image selecting region 56, a grid image selecting region 57, and a coolant discharge path selecting region 58. When an operator selects the taken image selecting region 56, an image taken by the imaging portions 12 is displayed on the screen area 50. When an operator selects the grid image selecting region 57, a grid image generated by the dividing unit 36 is displayed on the screen area 50.

The second image selection area 53 is a selection area for displaying an image as viewed in a second coolant discharge direction of another liquid discharging portion 11 from the other imaging portion 12, which is different from the image of the first image selection area 52, on the screen. This image is not illustrated. The second image selection area 53 includes a taken image selecting region 59, a grid image selecting region 60, and a coolant discharge path selecting region 61, which operate in a manner similar to the selecting regions 56 to 58, respectively, of the first image selection area 52.

While a plurality of imaging portions and a plurality of liquid discharging portions are present in the description of the present embodiment, the embodiment is not limited thereto. A single imaging portion may move and perform imaging at different angles. Similarly, a single liquid discharging portion may move from the position in the first coolant discharge direction to the position in the second coolant discharge direction by translational movement, rotation, and the like, and can thus discharge coolant from different positions.

In the automated cleaning mode, as illustrated in the upper screen of FIG. 3, a coolant discharge path that is automatically set is displayed on the screen area 50.

In the example of FIG. 3, patterns representing sections of grid regions and the volumes of chips are illustrated. Grid regions in the grid image displayed on the screen area 50 constitute an example of "a plurality of grid sections". Specifically, the display control unit 39 performs control to divide taken image data into a plurality of grid sections including a "first grid section" and a "second grid section" for display. Grid regions 67 with no pattern correspond to "no chips (class 0)". Grid regions 68 with a light pattern correspond to a "small volume of chips (class 1)". Grid regions 69 with a dark pattern correspond to a "large volume of chips (class 2)". The grid regions 68 with the light pattern constitute an example of the "first grid section". The grid regions 69 with the dark pattern constitute an example of the "second grid section".

An image within the grid regions 68 with the light pattern is an example of "image data associated with the first grid section". The "small volume of chips (class 1)" is an example of a "chip volume detected from the image data associated with the first grid section". An image within the grid regions 69 with the dark pattern is an example of "image data associated with the second grid section". The "large volume of chips (class 2)" is an example of a "chip volume detected from the image data associated with the second grid section". In this example, the difference in the darkness of the patterns enables visual recognition of the difference between the "chip volume detected from the image data associated with the first grid section" and the "chip volume detected from the image data associated with the second grid section". The light pattern is an example of display enabling recognition of a small chip volume in the "first grid section". The dark pattern is an example of display enabling recognition of a large chip volume in the "second grid section". In this manner, when the chip volume detected from image data associated with the "first grid section" is different from that detected from image data associated with the "second grid section", the display control unit 39 performs control to display the "first grid section" and the "second grid section" superimposed on the image data so that the difference in chip volume can be recognized. The difference may be distinguished by background color instead of the darkness of the patterns. For example, a yellow-colored background may be displayed for the "small volume of chips (class 1)" and an orange-colored background may be displayed for the "large volume of chips (class 2)".

In the instructed cleaning mode, an operator can indicate a position to be cleaned on a grid image or a taken image displayed on the screen area 50 (by touching the screen area 50, for example). A lower screen in FIG. 3 is an example of display in a case where an operator indicates a coolant discharging position on a grid image generated from a taken image by the dividing unit 36. The lower screen in FIG. 3 is displayed when the grid image selecting region 57 and then the coolant discharge path selecting region 58 are selected in this order. The display based on a grid image allows the operator to easily recognize positions at which the volume of chips is large. Note that the operator may indicate a coolant discharging position on a taken image displayed without any grid. The display based on a taken image allows the operator to determine the range of cleaning by watching the chips. For example, FIG. 4 illustrates an example of display of a taken image.

While the display unit 32 includes the screen area 50 and the respective selecting regions 54 to 61 in the present embodiment, the display unit 32, as a matter of course, may include the screen area 50 only, and the other selecting regions may be constituted by mechanical switches.

With reference to FIG. 4, a user interface and processing in generation of a coolant discharge path will be described. The operator first performs a first touch operation on a position represented by a circled "1". The first touch position is an example of a "first position on an image of the inside of the machine tool". The "first position on an image of the inside of the machine tool" can be freely specified by the operator by performing a user operation such as a tap on the screen or a click of a mouse. When the operator has performed a user operation to specify the "first position", the detecting unit 38 detects a "first input signal" associated with the "first position" input by the input unit 34 (a touch panel or a mouse). The "first input signal" includes coordinate values (two-dimensional positional coordinates) of the "first position".

The display control unit 39 causes a circled "1" at the first touch position to be displayed on the display unit 32. Accordingly, the display control unit 39 provides a first record in a discharge path table illustrated in (A) in FIG. 7. The discharge path table is stored in the storage unit 33. An indicated position (X1, Y1) refers to two-dimensional positional coordinates of the first touch position on the screen area 50. Machine coordinates (x1, y1, z1) refer to three-dimensional positional coordinates, corresponding to the indicated position (X1, Y1), on a component inside the machine tool 10. Assume that the association between the indicated position and the machine coordinates is obtained in advance and stored in the storage unit 33. The display control unit 39 can convert an indicated position into machine coordinates on the basis of the association.

The association between coordinates on an image and machine coordinates of the machine tool can be generated with a machine coordinate x1 being set to a fixed value. For example, in a case where an imaging portion fixed to a position above a face (x1=fixed value, y1, z1) on which chips are likely to accumulate is used, generation of the association between machine coordinates (y1, z1) and an indicated position (X1, Y1) in advance facilitates control of the liquid discharging portion. Machine coordinates may be three-dimensional positional coordinates in a space inside the machine tool instead of three-dimensional positional coordinates on a component inside the machine tool as in this example.

Subsequently, the operator performs a second touch operation on a position represented by a circled "2". The second touch position is an example of a "second position on the image of the inside of the machine tool". The "second position on the image of the inside of the machine tool" can also be freely specified by the operator by performing a user operation such as a tap on the screen or a click of the mouse. When the operator has performed a user operation to specify the "second position", the detecting unit 38 detects a "second input signal" associated with the "second position" input by the input unit 34 (the touch panel or the mouse). The "second input signal" includes coordinate values (two-dimensional positional coordinates) of the "second position". The "second position" is a position indicated by the operator subsequent to the "first position", for example.

The display control unit 39 causes a circled "2" to be displayed at the second touch position on the display unit 32. Accordingly, the display control unit 39 provides a second record in the discharge path table illustrated in (A) in FIG. 7. An indicated position (X2, Y2) refers to two-dimensional positional coordinates of the second touch position on the screen area 50. Machine coordinates (x2, y2, z2) refer to three-dimensional positional coordinates, corresponding to the indicated position (X2, Y2), on the component inside the machine tool 10.

As illustrated in a lower screen in FIG. 4, when the two positions are selected, the display control unit 39 causes an arrowed line from the circled "1" to the circled "2" to be displayed on the screen. The arrowed line represents a coolant discharge path, that is, a fluid discharge path. The display control unit 39 performs control to display the positions and the fluid discharge path to be superimposed on the image data of the inside of the machine tool 10 on the display unit 32. Specifically, the display control unit 39 causes the "first position", the "second position" and the "fluid discharge path connecting the first position with the second position" to be displayed. The "fluid discharge path connecting the first position with the second position" is represented by the arrowed line (line) connecting the first position with the second position. In this manner, the information processing device 30 generates a liquid discharge path "on the basis of the first position and the second position within the image taken by the imaging portion 12". The image data of the inside of the machine tool 10 used as a basis by the display control unit 39 is taken by the imaging portion 12.

As illustrated in an upper screen in FIG. 5, the operator in the present embodiment performs a touch operation of touching the arrowed line from the circled "1" to the circled "2" displayed on the screen of the touch panel to select the arrowed line. The touch operation on the arrowed line is an example of a user operation for selecting a fluid discharge path. The display control unit 39 causes a black circle to be displayed on the arrowed line from the circled "1" to the circled "2" on the display unit 32. The black circle represents a via-point.

When a "discharge path", that is, an arrowed line is selected in this manner, the display control unit 39 causes the "via-point" to be displayed between the "first position" and the "second position" on the display unit 32. The operator can "select a discharge path" by a user operation such as a tap on the screen or a click of a mouse. The detecting unit 38 detects "selection of a discharge path" made by a user operation through an input of the input unit 34 (the touch panel or the mouse). In this example, an arrowed line is selected as a "discharge path". The circled "1" is an example of the "first position". The circled "2" is an example of the "second position". The black circle is an example of the displayed "via-point".

As illustrated in a lower screen in FIG. 5, the operator selects the black circle (for example, performs a touch operation of touching the black circle on the screen), and performs a slide operation of sliding the touched black circle. The touch operation and the slide operation on the black circle correspond to user operations of selecting and moving a via-point. The display control unit 39 moves the black circle in the image data of the inside of the machine tool 10 in accordance with the slide operation, and displays the moved black circle on the display unit 32. The operator then deselects the black circle (for example, performs a release operation of releasing the touch on the black circle on the screen). As a result, the display control unit 39 replaces the black circle with a circled "3" on the display unit 32. In this process, the display control unit 39 inserts the second record in a discharge path table illustrated in (B) in FIG. 7. An indicated position (X3, Y3) refers to two-dimensional positional coordinates of the release position on the screen area 50. Machine coordinates (x3, y3, z3) refer to three-dimensional positional coordinates, corresponding to the indicated position (X3, Y3), on the component inside the machine tool 10. The display control unit 39 causes an arrowed line from the circled "1" to the circled "3" and an arrowed line from the circled "3" to the circled "2" to be displayed on the display unit 32. Thus, the coolant discharge path (fluid discharge path) moves in accordance with the touch operation and the slide operation.

When the discharge path is selected, the via-point is thus displayed, and the "via-point" is moved as described above, the display control unit 39 performs control to move the "via-point" in the image data and display the moved "via-point" on the display unit 32. The operator can "move a via-point" by a user operation such as a slide operation on the screen or a drag operation of a mouse. The circled "3" is an example of a moved via-point. The display control unit 39 further performs control to display the fluid discharge path connecting the three positions, that is, the first position (the circled "1"), the via-point (circled "3") at the moved position, and the second position (the circled "2") in this order on the display unit 32.

As illustrated in an upper screen in FIG. 6, the operator performs a touch operation of touching the arrowed line from the circled "3" to the circled "2". The display control unit 39 causes a black circle representing a via-point to be displayed on the arrowed line from the circled "3" to the circled "2" on the display unit 32. The operator similarly performs a slide operation and a release operation.

As illustrated in a lower screen in FIG. 6, the display control unit 39 replaces the black circle with a circled "4" on the display unit 32. In this process, the display control unit 39 inserts the third record in a discharge path table illustrated in (C) in FIG. 7. The display control unit 39 causes an arrowed line from the circled "1" to the circled "3", an arrowed line from the circled "3" to the circled "4", and an arrowed line from the circled "4" to the circled "2" to be displayed on the display unit 32.

Note that, in the present embodiment, a discharge path through which fluid is discharged in the order of 1→3→4→2 is generated. Fluid can also be reversely discharged through the discharge path in the order of 2→4→3→1. In this case, the discharge path may be reconfigured in the order ending with 1 by double-clicking on the circled "1". Alternatively, the discharge path may be generated by selecting a discharge path corresponding to the arrow between "3" and "4" and reversing the arrow. For example, when the arrow between "3" and "4" is reversed, a path through which fluid is discharged in the order of 1→3→(positional movement without fluid discharge) →4→3→(positional movement without fluid discharge) →4→2 is obtained.

Figure 8:
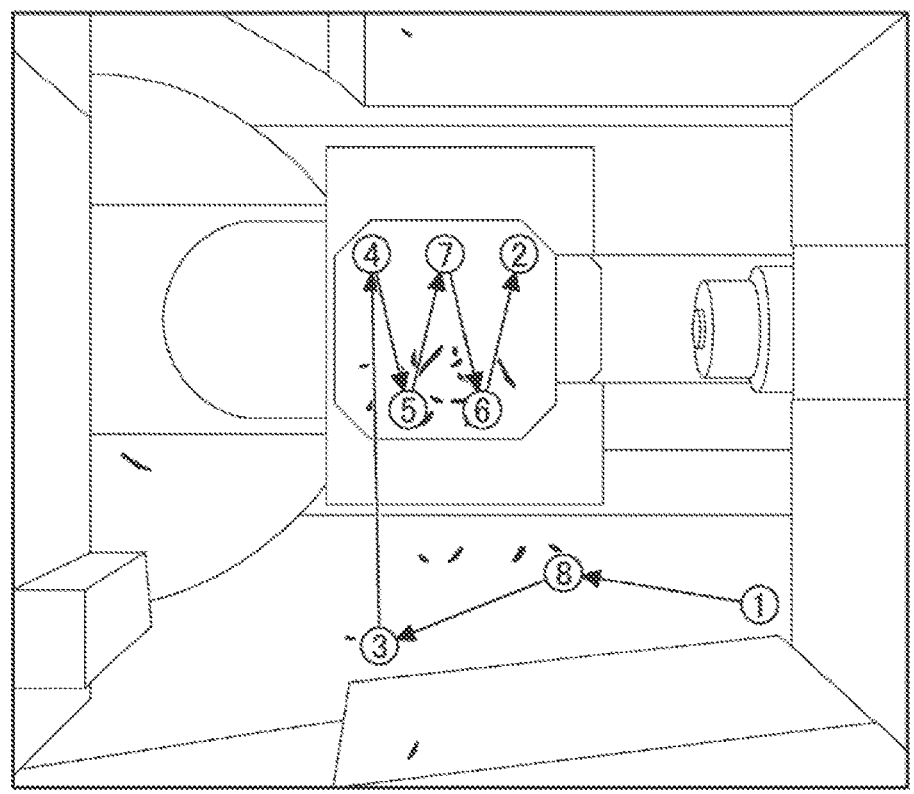
FIG. 8 illustrates an example of display in a process of generating a coolant discharge path in instructed cleaning and an example of a discharge path table.

An upper screen in FIG. 8 illustrates only the taken image part, which is a part of display on the display unit 32. As illustrated in the upper screen in FIG. 8, the operator repeats similar user operations to provide a circled "5" between the circled "4" and the circled "2", provide a circled "6" between the circled "5" and the circled "2", provide a circled "7" between the circled "5" and the circled "6", and provide a circled "8" between the circled "1" and circled "3". These user operations cause the display control unit 39 to generate a discharge path table illustrated in a lower part of FIG. 8. The display control unit 39 then causes the circled "1" to "8" and arrowed lines to be displayed on the display unit 32.

Figure 9:
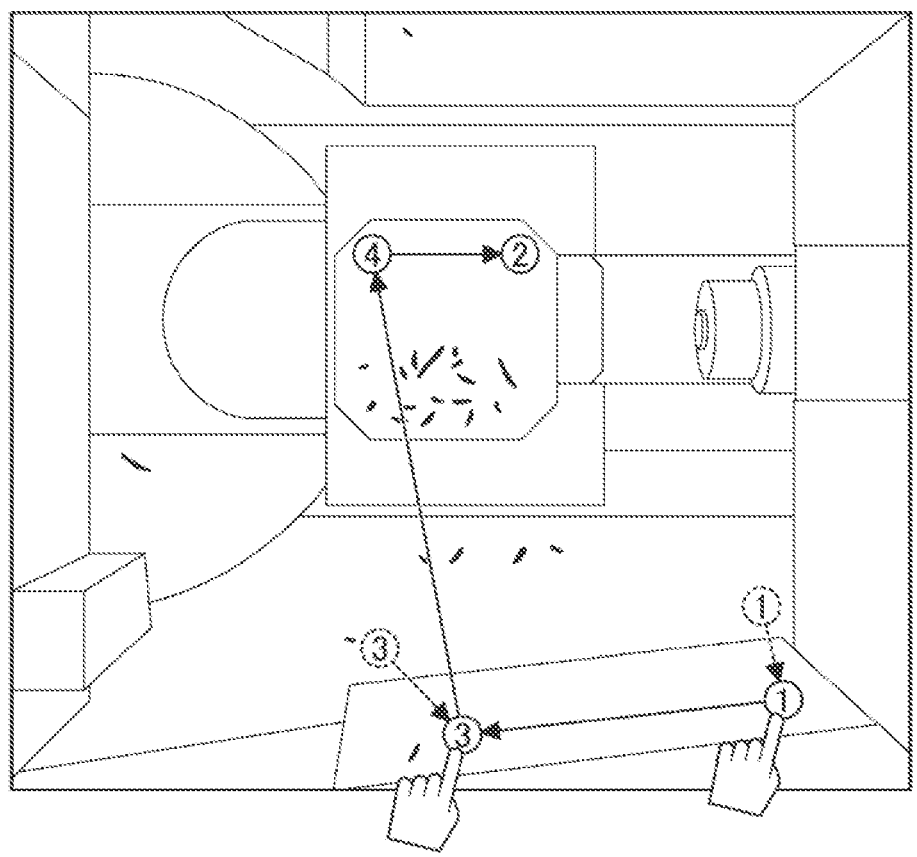
FIG. 9 illustrates an example of display in a process of generating a coolant discharge path in instructed cleaning and an example of a discharge path table.

As illustrated in an upper screen in FIG. 9, the position of a circle that has already been set can also be moved. In this example, the position of the circled "1", which has been specified first, is to be selected and moved, and the position of the circled "3", which has been a via-point, is to be selected and moved.

The operator performs a touch operation, a slide operation, and a release operation on the circled "1" on the lower screen in FIG. 6. As illustrated in a lower part of FIG. 9, the display control unit 39 rewrites the indicated position in the first record of the discharge path table ((c) in FIG. 7) from (X1, Y1) to (X101, Y101). (X101, Y101) is a release position of the circled "1". The display control unit 39 further rewrites the machine coordinates from (x1, y1, z1) to (x101, y101, z101). The display control unit 39 then causes an arrowed line from the circled "1" to the circled "3" to be redisplayed.

The operator further performs a touch operation, a slide operation, and a release operation on the circled "3" on the lower screen in FIG. 6. As illustrated in the lower part of FIG. 9, the display control unit 39 rewrites the indicated position in the second record of the discharge path table ((c) in FIG. 7) from (X3, Y3) to (X103, Y103). (X103, Y103) is a release position of the circled "3". The display control unit 39 rewrites the machine coordinates from (x3, y3, z3) to (x103, y103, z103). The display control unit 39 then causes an arrowed line from the circled "1" to the circled "3" and an arrowed line from the circled "3" to the circled "4" to be redisplayed.

(Example of Control in Instructed Cleaning)

Figure 10:
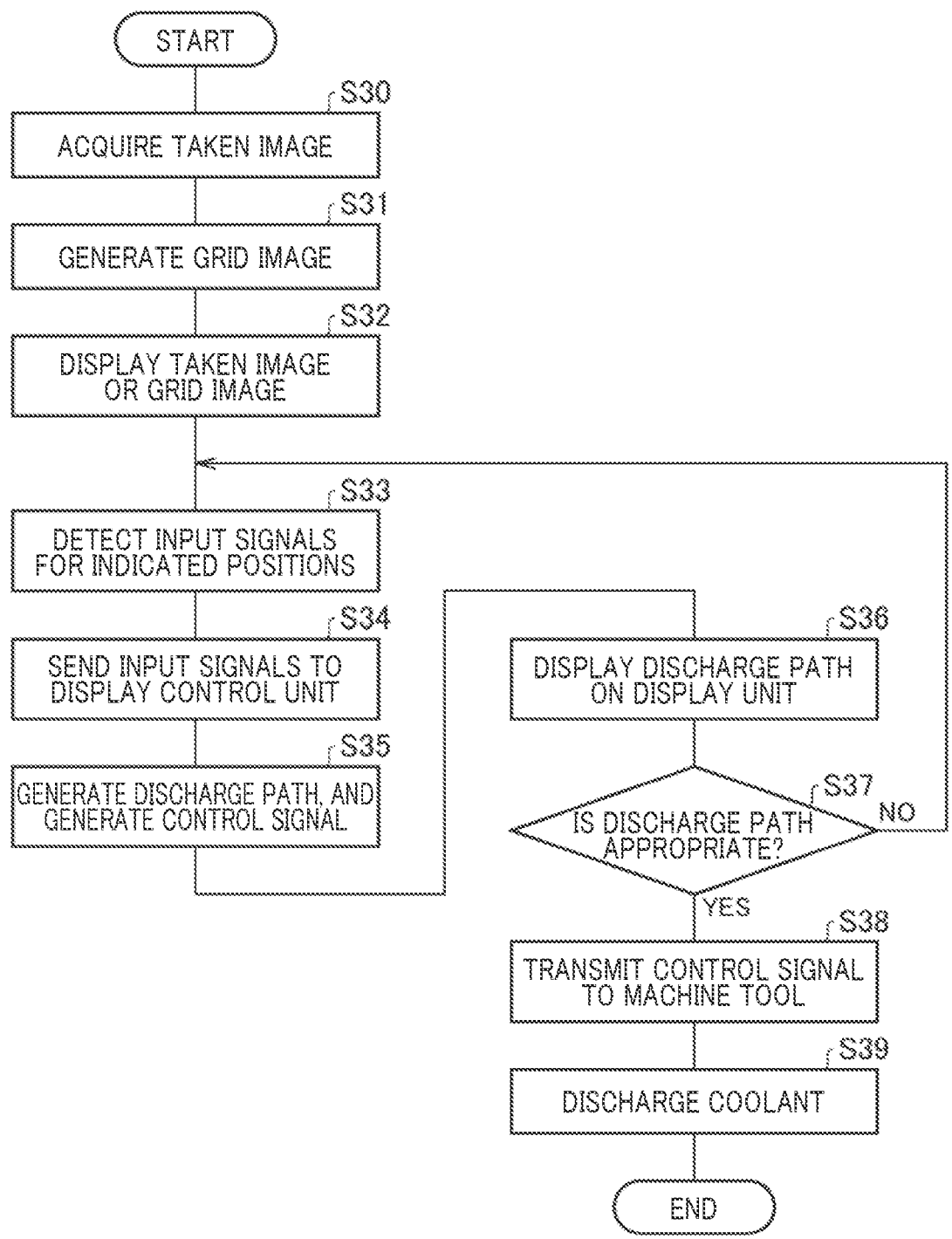
FIG. 10 is a flowchart for explaining a control process in instructed cleaning.

An example of control in the instructed cleaning in the present embodiment will be explained with reference to a flowchart of FIG. 10. FIG. 10 is a flowchart illustrating an example of operations in the instructed cleaning of the machining system 1 according to the present embodiment.

First, the imaging portion 12 of the machine tool 10 performs imaging, and the acquisition unit 35 of the information processing device 30 acquires a taken image (S30). The dividing unit 36 generates grid regions for the taken image acquired in step S30 to generate a grid image (S31). The display unit 32 displays the grid image generated in step S31 or the taken image (S32).

When the operator has recognized chips in the displayed image and has indicated positions to which coolant is to be discharged by using the input unit 34, the detecting unit 38 detects an input signal for each of the positions (S33). Upon detecting the input signals, the detecting unit 38 passes the input signals to the display control unit 39 (S34).

As described above, the display control unit 39 generates a coolant discharge path in view of the indicated order in a target area on the basis of the input signals, and generates a control signal (including machine coordinates arranged in the order) for control to discharge coolant in accordance with the discharge path (S35). The display unit 32 displays the taken image or the grid image with the generated discharge path superimposed thereon (S36). The operator checks the discharge path, and if the discharge path is to be corrected, the operation returns to step S33 (S37). If the discharge path need not be corrected, the transmission unit 40 transmits the generated control signal to the machine tool 10 (S38), and the machine tool 10 drives the nozzle to discharge coolant in accordance with the directions of the arrowed lines of the discharge path (S39), and terminates the operation.

While an example in which display on the screen area 50 is based on a taken image is presented in FIG. 5, the display may be based on a grid image as illustrated in FIG. 11. Although not illustrated in FIG. 11, the automated cleaning mode selecting region 54 and the instructed cleaning mode selecting region 55 in the mode selection area 51 illustrated in FIG. 5 are similarly present in the case of FIG. 11. The operations and the control processes are similar to those in the case of FIG. 5 except that a grid image is to be displayed. The display based on a grid image makes it easier for the operator to recognize positions at which the volume of chips is large. Alternatively, as illustrated in FIG. 12, positions at which chips are likely to accumulate may be indicated before starting machining on the basis of previous data, and a coolant discharge path may be generated on the basis of the positions. In this case, a coolant discharge path can be generated on a screen on which an image without chips is displayed.

Figure 14:
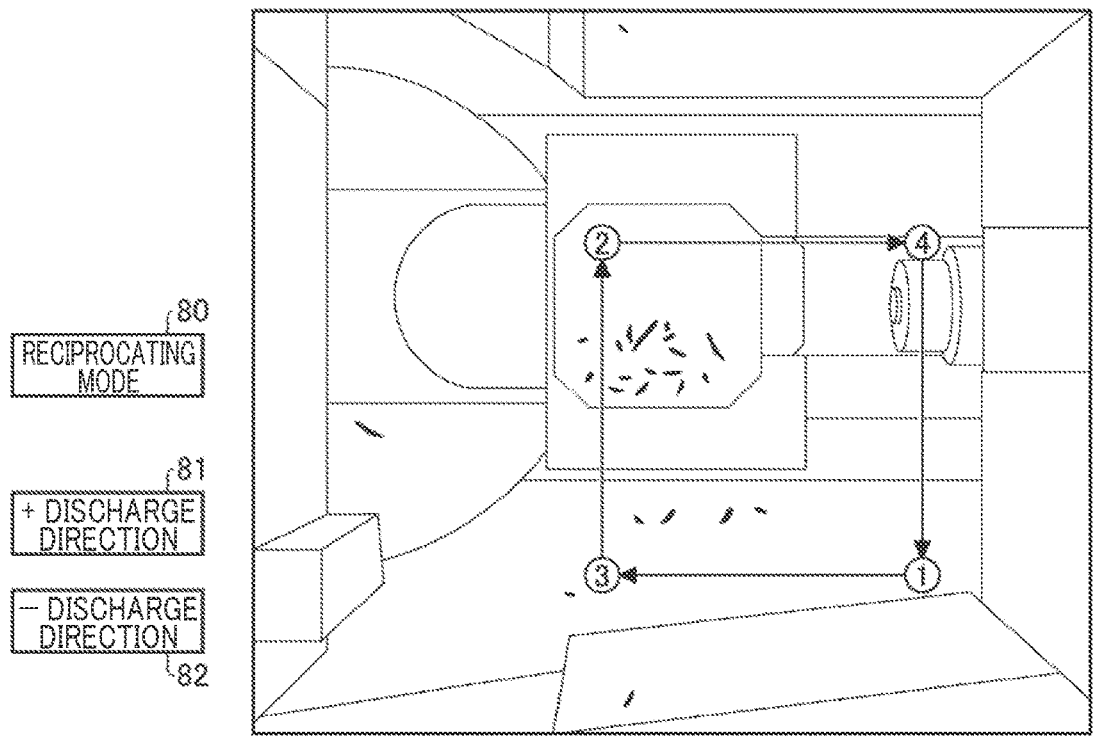
FIG. 14 illustrates an example of display in a process of generating a coolant discharge path in instructed cleaning and an example of a discharge path table.

Still alternatively, as illustrated in FIGS. 13 and 14, a quadrangular coolant discharge path may be generated on the basis of two indicated positions. In this example, the detecting unit 38 detects a first input signal associated with a first position in an image of the inside of the machine tool 10, a second input signal associated with a second position in the image of the inside of the machine tool 10, and a third input signal relating to multiple discharges, and, on the basis of these signals, the display control unit 39 performs control to display (i) the first position, (ii) the second position, and (iii) a third position and (iv) a fourth position, which correspond to corners, that are different from the first position and the second position, of four corners of a quadrangle having a diagonal being a line connecting the first position and the second position, to be superimposed on image data of a target area.

In this case, as illustrated in FIG. 13, a reciprocating mode selecting region 80, a plus discharge direction selecting region 81, and a minus discharge direction selecting region 82 are displayed. The mode selection area 51, the first image selection area 52, and the second image selection area 53 are as described above, and description thereof is therefore omitted here.

The display control unit 39 causes the circled "1" to be displayed at the first touch position. Accordingly, the display control unit 39 provides a first record in a discharge path table illustrated in (A) in FIG. 14. The discharge path table is stored in the storage unit 33. An indicated position (X1, Y1) refers to two-dimensional positional coordinates of the first touch position on the screen area 50. Machine coordinates (x1, y1, z1) refer to three-dimensional positional coordinates, corresponding to the indicated position (X1, Y1), on a component inside the machine tool 10. Assume that the association between the indicated position and the machine coordinates is obtained in advance and stored in the storage unit 33. The display control unit 39 can convert an indicated position into machine coordinates on the basis of the association.

Subsequently, the operator performs a second touch operation on a position represented by the circled "2". The second touch position is an example of the "second position on the image inside the machine tool". The "second position on the image of the inside of the machine tool" can also be freely specified by the operator by performing a user operation such as a tap on the screen or a click of the mouse. When the operator has performed a user operation to specify the "second position", the detecting unit 38 detects a "second input signal" associated with the "second position" input by the input unit 34 (the touch panel or the mouse). The "second input signal" includes coordinate values (two-dimensional positional coordinates) of the "second position". The "second position" is a position indicated by the operator subsequent to the "first position", for example.

At a point when the second touch operation on the position of the circled "2" is detected, the display control unit 39 causes the circled "2" to be displayed at the second touch position, and an arrowed line from the circled "1" to the circled "2" to be displayed on the screen. Accordingly, the display control unit 39 provides a second record in the discharge path table illustrated in (A) in FIG. 14. An indicated position (X2, Y2) refers to two-dimensional positional coordinates of the second touch position on the screen area 50. Machine coordinates (x2, y2, z2) refer to three-dimensional positional coordinates, corresponding to the indicated position (X2, Y2), on the component inside the machine tool 10.

When the operator selects the reciprocating mode selecting region 80, the detecting unit 38 detects a "third input signal on a plurality of discharges" in response to the input of the input unit 34 (the touch panel or the mouse). The selection of the reciprocating mode selecting region 80 is made by the user by performing a user operation such as a tap on the screen or a click of the mouse. "A plurality of discharges" refers to discharging of coolant twice or more times while linearly moving the discharge position. In this example, as illustrated in an upper screen of FIG. 14, discharging of coolant is performed four times while linearly moving the discharge position. When the "third input signal on a plurality of discharges" is detected, the display control unit 39 displays, on the display unit 32, a circled "3" and a circled "4" at diagonally opposite corners of a quadrangle having the circled "1" and the circled "2" at the other diagonally opposite corners as illustrated in a lower screen of FIG. 13. In this manner, the display control unit 39 performs control to display the "first position", the "second position", the "third position" and the "fourth position" on the basis of the "first input signal", the "second input signal", and the "third input signal", which are "signals detected by the detecting unit". The circled "1" to "4" are examples of the "first position" to the "fourth position", respectively. The "third position" and the "fourth position" are "corners different from the first position and the second position among the four corners of the quadrangle having a diagonal being a line connecting the first position and the second position". In this example, a quadrangle with four sides corresponding to a line connecting the circled "1" and the circled "3", a line connecting the circled "3" and the circled "2", a line connecting the circled "2" and the circled "4", and a line connecting the circled "4" and the circled "1" (see the upper screen in FIG. 14) corresponds to the "quadrangle having a diagonal being a line connecting the first position and the second position". The "quadrangle having a diagonal being a line connecting the first position and the second position" is a square in this example, but may alternatively be a quadrangle other than a square, such as a rectangle or a rhombus. The "first position", the "second position", the "third position", and the "fourth position" are "superimposed on image data obtained by imaging of a target area" when displayed.

When the operator selects the plus discharge direction selecting region 81, the display control unit 39 displays a clockwise discharge path on the display unit 32 as illustrated in the upper screen of FIG. 14. Specifically, the display control unit 39 displays an arrowed line from the circled "1" to the circled "3", an arrowed line from the circled "3" to the circled "2", an arrowed line from the circled "2" to the circled "4", and an arrowed line from the circled "4" to the circled "1". This means that the discharge is performed four times along the arrowed lines. The display control unit 39 inserts a second record and a fourth record in the discharge path table illustrated in (B) in FIG. 14. An indicated position (X3, Y3) refers to two-dimensional positional coordinates of the circled "3" on the screen area 50. Machine coordinates (x3, y3, z3) refer to three-dimensional positional coordinates, corresponding to the indicated position (X3, Y3), on the component inside the machine tool 10. An indicated position (X4, Y4) refers to two-dimensional positional coordinates of the circled "4" on the screen area 50. Machine coordinates (x4, y4, z4) refer to three-dimensional positional coordinates, corresponding to the indicated position (X4, Y4), on the component inside the machine tool 10.

When the operator selects the minus discharge direction selecting region 82, the display control unit 39 displays a counterclockwise discharge path on the display unit 32. Specifically, the display control unit 39 displays an arrowed line from the circled "1" to the circled "4", an arrowed line from the circled "4" to the circled "2", an arrowed line from the circled "2" to the circled "3", and an arrowed line from the circled "3" to the circled "1". The display control unit 39 then generates the discharge path table in which the records are arranged in the indicated order of "1", "4", "2", and "3". When the reciprocating mode selecting region 80 is selected, that is, before the plus discharge direction selecting region 81 or the minus discharge direction selecting region 82 is selected, the display control unit 39 may display a discharge path (the clockwise discharge path or the counterclockwise discharge path) forming the aforementioned quadrangle. Even when the reciprocating mode selecting region 80 is not selected, the display control unit 39 may switch the display to include a discharge path (the clockwise discharge path or the counterclockwise discharge path) forming the aforementioned quadrangle at some time (for example, at a point after a lapse of a predetermined time from the second touch operation on the position represented by the circled "2".

As illustrated in FIG. 15, the position of a circle that is already set can be moved. In this example, the position of the circled "4" is selected to be moved.

The operator performs a touch operation and a slide operation on the circled "4" in the upper screen in FIG. 15. In response to the slide operation, the display control unit 39 moves the circled "4" on the display unit 32. The touch operation on the circled "4" corresponds to "selection of the fourth position". The selected circled "4" is moved as a selected point by the slide operation.

When the operator performs a release operation on the circled "4", the display control unit 39 displays the circled "4" on the display unit 32 as illustrated in the lower screen in FIG. 15. As illustrated in (C) in FIG. 14, the display control unit 39 replaces the indicated position (X4, Y4) in the fourth record in the discharge path table with (X104, Y104). (X104, Y104) is a position at which the circled "4" is released as illustrated in the lower screen in FIG. 15. The display control unit 39 further replaces the machine coordinates (x4, y4, z4) with (x104, y104, z104). The display control unit 39 also changes the display of the arrowed line from the circled "2" to the circled "4" and the arrowed line from the circled "4" to the circled "1". In other words, the display control unit 39 performs control to display a quadrangular discharge path formed by the circled "1" (first position), the circled "3" (third position), the circled "2" (second position), and the moved circled "4" (selected point) in this order.

Subsequently, as illustrated in an upper screen in FIG. 16, the operator performs a touch operation on the arrowed line from the circled "4" to the circled "1". A touch operation on an arrowed line is an example of a user operation to select a coolant discharge path (fluid discharge path). The display control unit 39 displays a black circle at a middle point on the arrowed line from the circled "4" to the circled "1" on the display unit 32. The black circle represents a via-point. In this manner, the display control unit 39 performs control to display a via-point between the circled "1" (first position) and the circled "4" (fourth position).

As illustrated in a lower screen in FIG. 16, the operator performs a slide operation on the touched black circle. A touch operation and a slide operation on a black circle correspond to user operations to select and move a via-point. In response to the slide operation, the display control unit 39 moves the black circle, which is the via-point between the circled "1" (first position) and the circled "4" (fourth position) on the display unit 32.

The operator then performs a release operation at a position of a circled "5" illustrated in a lower screen in FIG. 16. As a result, the display control unit 39 switches the black circle to the circled "5" on the display unit 32. At this point, the display control unit 39 adds a fifth record in the discharge path table illustrated in (D) in FIG. 14. An indicated position (X5, Y5) refers to two-dimensional positional coordinates of the release position on the screen area 50. Machine coordinates (x5, y5, z5) refer to three-dimensional positional coordinates, corresponding to the indicated position (X5, Y5), on the component inside the machine tool 10. The display control unit 39 displays an arrowed line from the circled "4" to the circled "5" and an arrowed line from the circled "5" to the circled "1" on the display unit 32. In this manner, when the black circle (via-point) is moved, the display control unit 39 performs control to display a fluid discharge path connecting three positions, which are the circled "4" (fourth position), the circled "5" (via-point at the moved position) to which the moved black circle is switched, and the circled "1" (first position) in this order.

<Coolant Discharge Path in Automated Cleaning>

A coolant discharge path in automated cleaning will be explained. Note that discharging coolant on the basis of an automatic detection signal from the chip recognizing unit 37 is referred to as automated cleaning. A coolant discharge path associated with a relevant area can be selected from a plurality of coolant discharge paths stored in advance in the storage unit 33, or an optimum coolant discharge path can be generated on the basis of a predetermined algorithm. Furthermore, an optimum coolant discharge path can also be generated by using a predetermined learning model.

An upper drawing in FIG. 17 illustrates an example of a cleaning path pattern superimposed on a taken image. A lower drawing in FIG. 17 illustrates an example of a cleaning path pattern superimposed on a grid image. Automated cleaning may be performed in a state in which a taken image is displayed, or in a state in which a grid image is displayed.

On the drawings illustrated in FIG. 17, division into areas A to G is set. A cleaning path pattern is stored in for each area before automated cleaning is performed.

The area A includes the pallet 14. In the storage unit 33, the area A is associated with a zigzag coolant discharge path over the pallet 14 as indicated by arrows 64. When the display control unit 39 has determined that the chip volume in the area A exceeds a threshold, the coolant discharge path indicated by the arrows 64 in FIG. 17 is selected and set as illustrated in the upper screen in FIG. 3. In the upper screen in FIG. 3, patterns representing sections of grid regions and the chip volumes. Grid regions with no pattern correspond to "no chips (class 0)", which will be describe later. Grid regions with a light pattern correspond to a "small volume of chips (class 1)", which will be described later. Grid regions with a dark pattern correspond to a "large volume of chips (class 2)", which will be described later.

The area B includes the slope face 19 and the flat face 20. In the storage unit 33, the area B is associated with a linearly reciprocating coolant discharge path from an upper position over the slope face 19 in an area B2 as indicated by arrows 61. Furthermore, the area B is associated with a cleaning coolant discharge path over the flat face 20 in an area B1 and toward the shooter 21 as indicated by arrows 62. When the display control unit 39 has determined that the chip volume in the area B exceeds a threshold, the coolant discharge paths indicated by the arrows 61 and the arrows 62 are selected and set.

The area D includes the side part 26a, the side part 26b, and the central part 24. In the storage unit 33, the area D is associated with a plurality of linear cleaning coolant discharge paths in one direction away from the revolving door 17 over the side part 26a and the side part 26b as indicated by arrows 65a and arrows 65b. Furthermore, the area D is associated with a plurality of linear cleaning coolant discharge paths reciprocating in directions parallel to the revolving door 17 as indicated by arrows 65c. When the display control unit 39 has determined that the chip volume in the area D exceeds a threshold, the coolant discharge paths indicated by the arrows 65a, the arrows 65b and the arrows 65c are selected and set.

The area F includes the side face 18a. In the storage unit 33, the area F is associated with a linear coolant discharge path over an upper position of the side face 18a as indicated by an arrow 63. When the display control unit 39 has determined that the chip volume in the area F exceeds a threshold, the coolant discharge path indicated by the arrow 63 is selected and set.

The area G includes the side face 18b. In the storage unit 33, the area G is associated with a linear coolant discharge path over an upper position of the side face 18b as indicated by an arrow 66. When the display control unit 39 has determined that the chip volume in the area G exceeds a threshold, the coolant discharge path indicated by the arrow 66 is selected and set. The area C and the area E are also associated with coolant discharge paths, but the illustration thereof is omitted.

<Example of Control in Automated Cleaning>

An example of control in automated cleaning of the machining system 1 according to the present embodiment will be explained with referenced to a flowchart of control processes in automated cleaning ("a chip cleaning flow in the machining chamber") illustrated in upper part of FIG. 18.

First, a workpiece is conveyed into the machine tool 10, and machining is started (S10). Chips are produced during the machining.

Subsequently, the imaging portion 12 of the machine tool 10 takes an image, and the acquisition unit 35 of the information processing device 30 acquires the taken image (S11). The dividing unit 36 divides the image taken in step S11 into a plurality of grid regions to generate a grid image (S12). The chip recognizing unit 37 determines whether or not chips are present or the chip volume in each of grid regions of the grid image generated in step S12 (S13). If no chips are present and machining is continued, the process returns to step S11, and a taken image is acquired. If no chips are present and machining is completed, the operation of the machining system 1 is terminated (S14). If chips are present, the chip recognizing unit 37 outputs, to the display control unit 39, an automatic detection signal including predetermined position information corresponding to the positions of the grid regions in the grid image and information on the chip volumes (S15).

The display control unit 39 identifies a relevant area (an area in which the chip volume exceeds a threshold) on the basis of the automatic detection signal, and displays a coolant discharge path in the relevant area on the display unit 32. The transmission unit 40 outputs a control signal on the coolant discharge path in the relevant area to the liquid discharging portion 11 (S16). In a case where a plurality of relevant areas are present, the control signal includes information on an order of cleaning in which coolant is discharged to the relevant areas. The transmission unit 40 transmits a discharging signal to the machine tool 10 (S17).

The machine tool 10 controls the liquid discharging portion 11 on the basis of the control signal, and discharges coolant to the relevant areas in the order of cleaning (S18). When discharge of coolant to all the relevant areas is completed, the process returns to step S11, and the above-described processes are repeated until machining of the workpiece is completed. The processes of cleaning in automated cleaning are as described above.

<Chip Recognition>

A method for automatically recognizing chips by using taken images will be explained. A block diagram ("machine learning of chip detection by the chip recognizing unit 37") in lower part of FIG. 18 is a schematic diagram illustrating a configuration of the chip recognizing unit 37 that automatically recognizes chips. As illustrated in the block diagram in the lower part of FIG. 18, the chip recognizing unit 37 includes a model learning unit 41, a calculation unit 43, and a determination unit 44. In addition, the storage unit 33 includes a model storage unit 42.

The model learning unit 41 generates a learning model. The learning model is a model capable of calculating, in response to an input of one of the grid regions generated by the dividing unit 36, which of predetermined items is relevant to the chips in the grid region and the probability of the relevance and outputting the calculation result. A learning model can be generated in advance by inputting a pair of input data and output data as training data into a convolutional neural network (CNN) in advance to cause the CNN to learn the data pair, for example. A typical CNN is a learning technique for extracting features in an image by a convolutional layer and a pooling layer, inputting the features into a neural network and processing the features therein, which is often used for feature extraction from an image. Note that a learning technique other than the CNN may be used to generate a learning model. In the present embodiment, a grid region can be used as input data, and information on whether or not chips are present and the chip volume in the grid region can be used as output data. As more training data are input, and as whether chips are present and the chip volume are learned for more grid regions (that is, more various grid regions), the accuracy of chip recognition in the learning model can be improved.

The model storage unit 42 stores a learning model capable of automatically determining whether chips are present. The learning model is read by the calculation unit 43 as necessary. While the chip recognizing unit 37 includes the model learning unit 41 and the storage unit 33 includes the model storage unit 42 in the present embodiment, a learning model may be generated by a device other than the information processing device 30, and the learning model may be stored in the storage unit 33 and read therefrom as necessary.

The calculation unit 43 calculates the probability that chips in a grid region correspond to a predetermined item. Specifically, the calculation unit 43 can use the learning model learned by the model learning unit 41 to calculate the probability that a grid region input as input data corresponds to each of three items, which are a "large volume of chips (class 2)", a "small volume of chips (class 1)" and "no chips (class 0)". Alternatively, the items may further be subdivided for calculation, or the probability of the presence of chips may simply be calculated.

The determination unit 44 determines which of classes 0 to 2 chips in the input grid region correspond to on the basis of the probabilities calculated by the calculation unit 43. The determination unit 44 can set how the determination is to be made on the basis of the probabilities calculated by the calculation unit 43 for chips present in the individual grid regions. For example, chips may be determined to correspond to the item with the highest probability among the probabilities of classes 0 to 2 calculated by calculation unit 43. Alternatively, when the probability of "chips being present (class 2+class 1)" is higher than the probability of "no chips (class 0)", such as when the probability of the "class 2" is calculated to be 25%, the probability of the "class 1" is calculated to be 35%, and the probability of the "class 0" is calculated to be 40%, chips may be determined to correspond to "class 1" (or "class 2"). When it is determined that chips are present in a grid region (that is, chips in a grid region corresponds to class 2 or class 1), the determination unit 44 outputs an automatic detection signal at least including information on a position in a taken image corresponding to the position of the grid region in a grid image to the display control unit 39 as described above. The automatic detection signal may include information on the chip volume.

As described above, the machining system 1 can automatically recognize whether chips are present on the basis of an image taken by an imaging portion 12 installed in the machine tool 10.

In the present embodiment, during machining or after completion of machining of a workpiece, the machining system 1 can perform automated cleaning in which chips are automatically recognized on the basis of an image taken by an imaging portion 12 and coolant is discharged. The automated cleaning may be periodically performed or may be performed in response to some instruction such as an instruction from the operator, for example.

In automated cleaning, the presence of chips may be recognized in a plurality of relevant areas. In order to respond to such a situation, the order of cleaning is preferably set in accordance with a certain rule. For example, a priority order of relevant areas may be provided in advance, and the cleaning order may be set on the basis of the priority order and the chip accumulation state (whether the chip volume is large, for example) obtained by the chip recognizing unit. In the priority order, the pallet 14, which is considered as most affecting machining, may be given the highest priority, the flat face 20 and the slope face 19, on which chips are likely to accumulate, and the revolving door 17, which moves toward the outside of the machine tool 10, may be given the second highest priority, and the others may be given the third priority, for example. In addition, the spindle may be cleaned only when a tool is changed. When discharging of coolant in the set cleaning order is completed, the series of processes of automated cleaning of chips recognized in a taken image are terminated.

Figure 19:
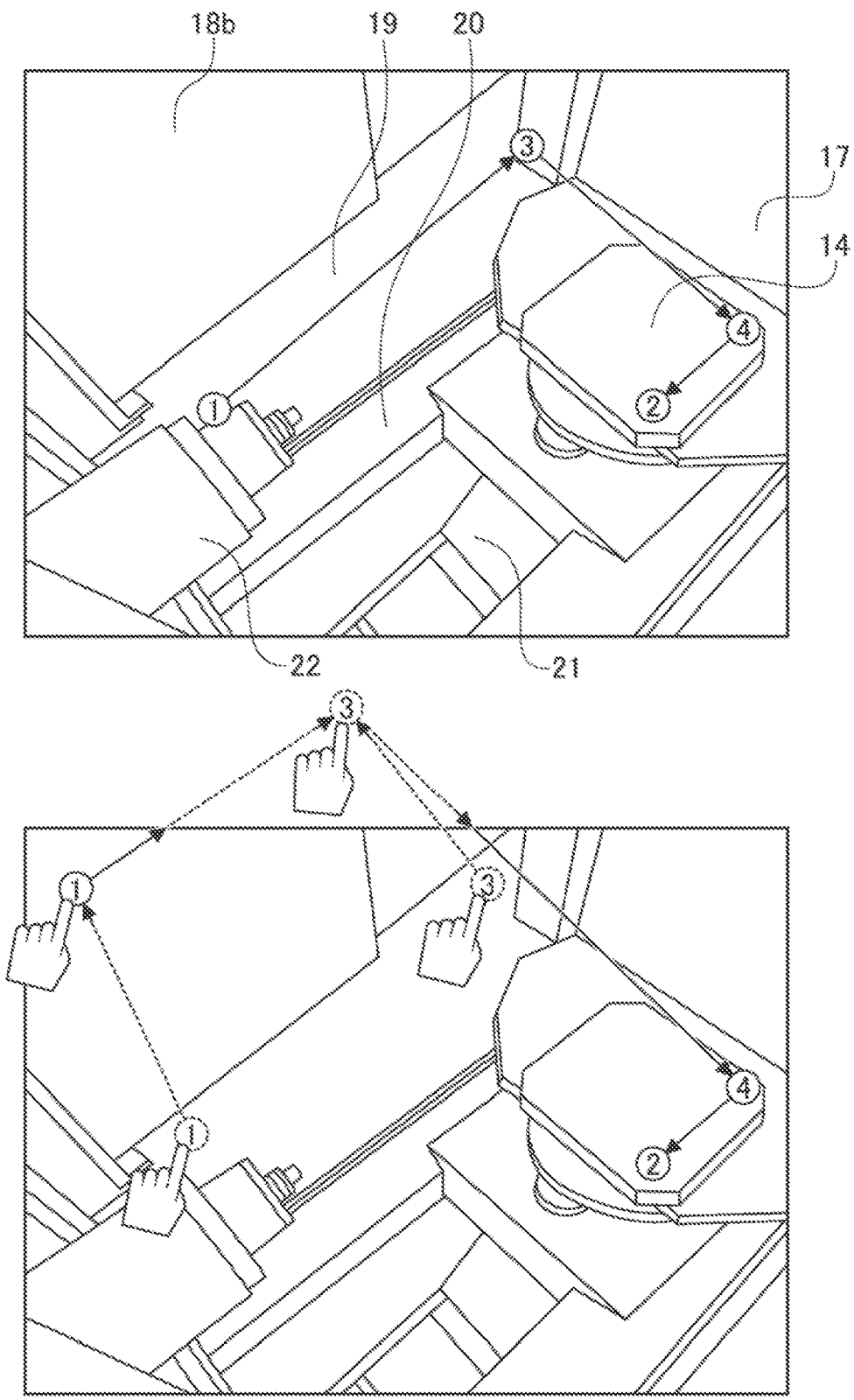
FIG. 19 illustrates an example of display of an image taken at a different angle.

As illustrated in FIG. 19, an image taken at a different angle may be displayed, and a coolant discharge path may be generated on the taken image. The image is taken at a different angle (at an oblique angle from above) by an imaging portion installed at a position different from the imaging portion that took the taken image in the description above.

In the case where an image taken at a different angle is displayed, a coolant discharge path can be generated through operations and processes similar to those described above. An upper screen in FIG. 19 illustrates the same state as in the lower screen in FIG. 6. A lower screen in FIG. 19 illustrates the same state as in the upper screen in FIG. 9. As a circled "3" (third position) illustrated in the lower screen in FIG. 19, a selected point can be moved to the outside of the taken image. The display control unit 39 also obtains indicated positions and machine coordinates in an area outside the taken image, and sets the obtained indicated positions and machine coordinates in the discharge path table.

Figure 20:
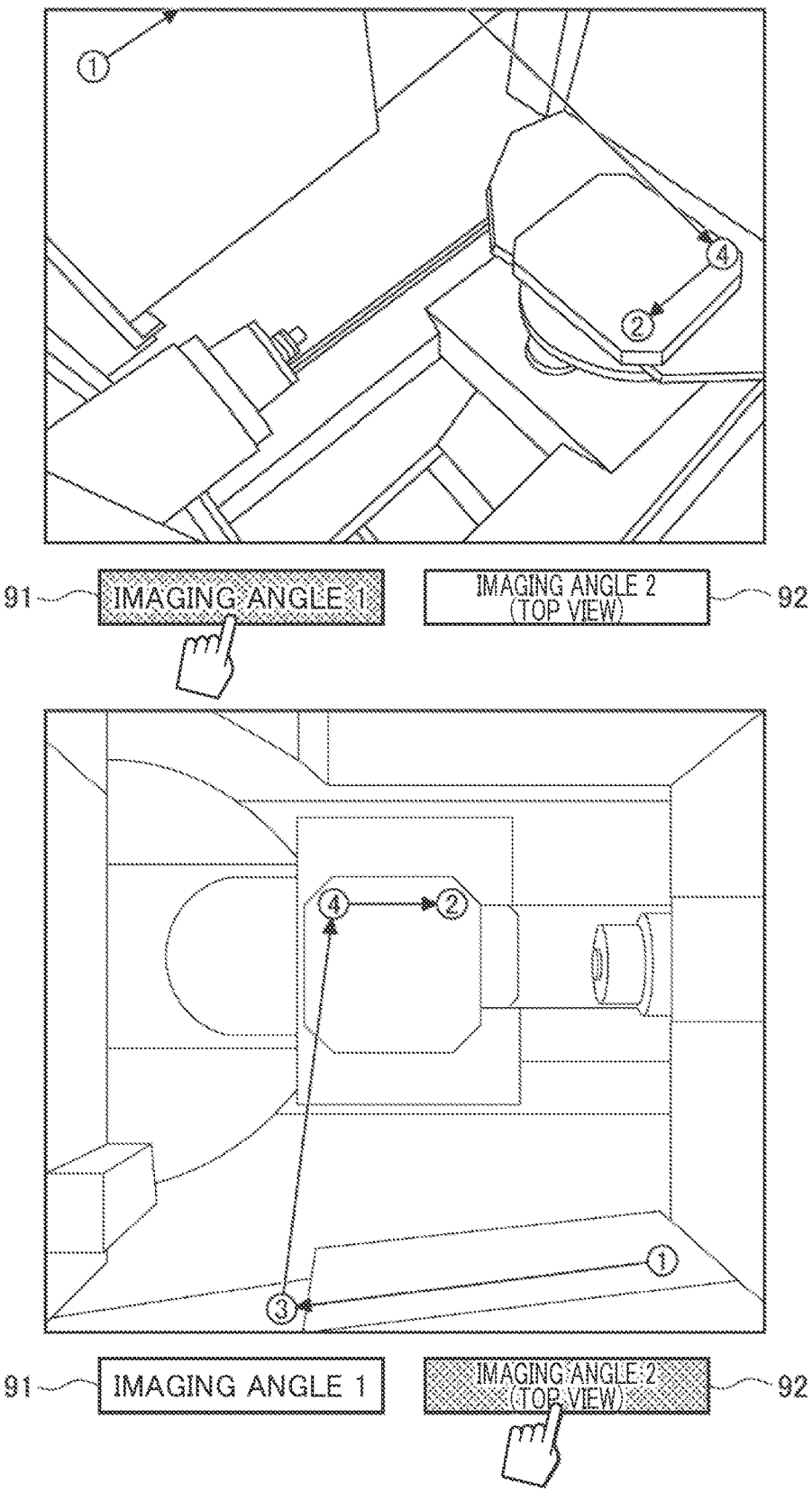
FIG. 20 illustrates an example of display relating to an angle switching operation.

The angle of a displayed taken image may be switchable. For example, as illustrated in FIG. 20, an imaging angle 1 selecting region 91 and an imaging angle 2 selecting region 92 (top view) are displayed. As in an upper screen in FIG. 20, when the operator has selected the imaging angle 1 selecting region 91, the display control unit 39 displays an image taken at a first imaging angle (at an oblique angle from above, for example). As in a lower screen in FIG. 20, when the operator has selected the imaging angle 2 selecting region 92 (top view), the display control unit 39 displays an image taken at a second imaging angle (from right above, for example).

<Modifications>
<Example without Display of Start Point and End Point>

While the circled "1" is displayed at the first touch position (an example of the first position, the circled "2" is displayed at the second touch position (an example of the second position), and the arrowed line representing the coolant discharge path (fluid discharge path) is then displayed in the embodiment as described with reference to the lower screen in FIG. 4, for example, only the arrowed line may be displayed without the circled "1" and the circled "2". Specifically, the display control unit 39 may delete the circled "1" and the circled "2" after displaying the arrowed line. In this manner, only the coolant discharge path (fluid discharge path) is displayed, and the coolant discharge path is therefore more easily viewable without being hidden by the taken image or the grid image.

<Example of Robot Use>

While an example in which the machine tool 10 includes the liquid discharging portion 11 and the imaging portion 12 has been presented in the embodiment, the liquid discharging portion 11 and the imaging portion 12 may be included in a robot instead of the machine tool 10. In other words, a robot may perform imaging and discharging of liquid. Alternatively, a robot including a gas discharging portion and the imaging portion 12 may be used. In other words, a robot may perform imaging and discharging of gas. The gas that is discharged is compressed air, for example. Chips can also be moved by gas. In the machine tool 10, a gas discharging portion may be used instead of the liquid discharging portion 11.

Figure 21:
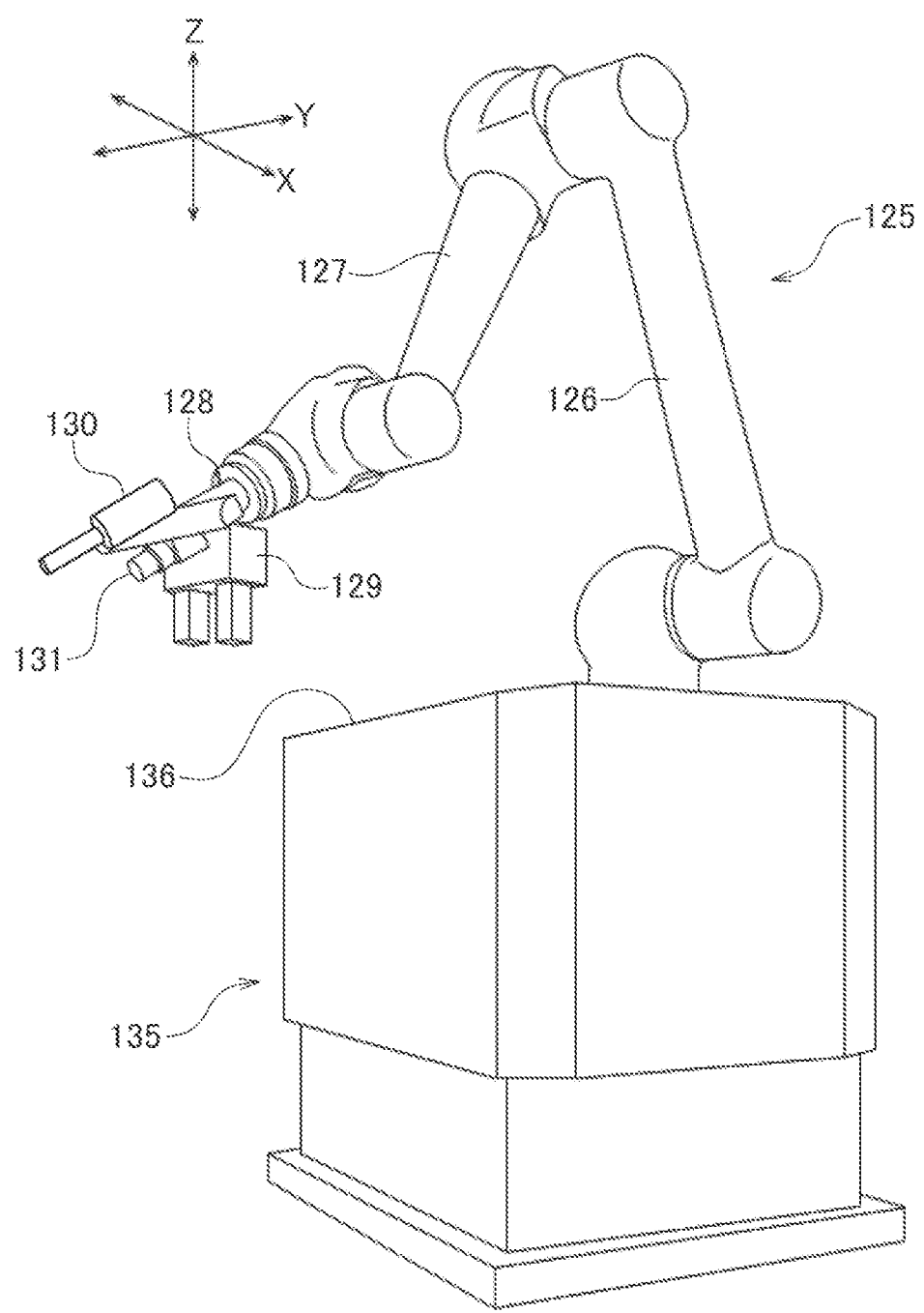
FIG. 21 is an external view of a robot.
Figure 22:
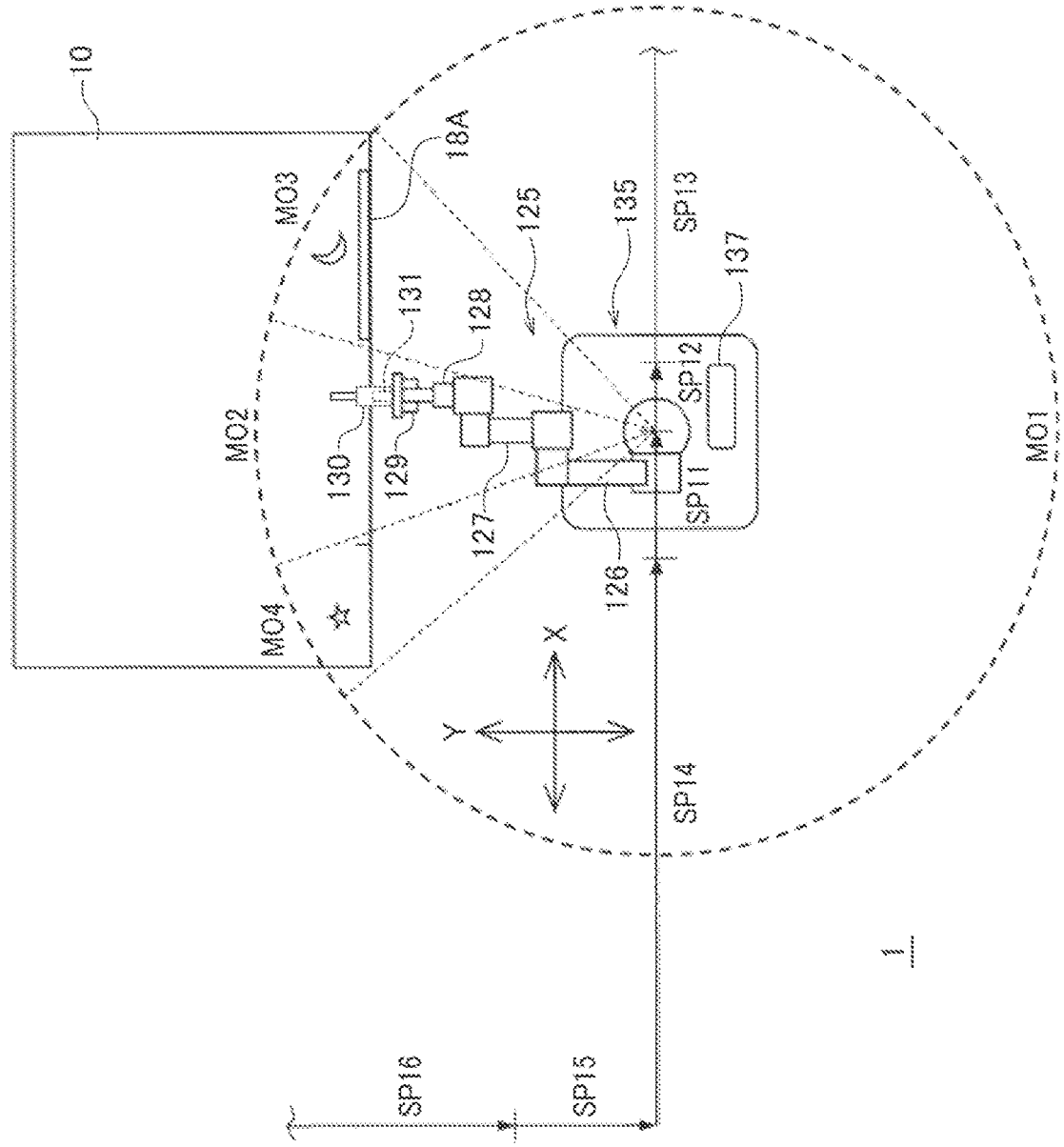
FIG. 22 is a top view of a robot.

An example of a robot will be illustrated. FIG. 21 is an external view of the robot. FIG. 22 is a top view of the robot. The robot includes a robot arm 125, which is a serial link mechanism, on an upper face 136 of a conveying device (automatic guided vehicle: AGV) 135. The robot arm 125 includes a first arm 126, a second arm 127, and a third arm 128. A camera 131 and a discharge nozzle 130 for air blow are attached to a leading end of the third arm 128. A robot control device 137 can move the robot arm 125, so that the camera 131 and the discharge nozzle 130 are held in a given direction at a given position. In addition, the robot control device 137 causes the camera 131 to take an image, and causes gas to be discharged through the discharge nozzle 130 to remove chips.

While the robot of FIG. 21 includes an imaging portion and a fluid discharging portion, the robot is not limited thereto. The robot may include an imaging portion, the machine tool may include a fluid discharging portion, and a personal computer other than the robot and the machine tool may include the display control unit. Which device to include each component such as the display control unit can be selected as appropriate.

An example of the use of the robot of FIG. 21 will be described. As illustrated in FIG. 22, the conveying device on which the robot is mounted moves to the front of the machine tool and stops. A camera mounted on the robot images the structure and marks inside the machine tool, to correct the position of the robot. The robot, which grasps a workpiece to be machined by the machine tool, moves the workpiece to be placed inside the machine tool. Before this movement, the camera, which is the imaging portion, takes an image again to detect the position of placement of the workpiece and the state around the placement position. When the workpiece is brought closer to the placement position, the robot discharges gas through the discharge nozzle to remove dust and the like from around the placement position, and places the workpiece at the placement position after discharging of gas through the discharge nozzle. Because the robot has the discharge nozzle, generation of a discharge path in view of how gas should be discharged may be performed on the operation panel of the machine tool or on a computer such as a tablet other than the machine tool and the robot.

<Separate Provision of Display Unit 32 and Input Unit 34>

The display unit 32 and the input unit 34 may be provided separately from the information processing device 30. In this case, the display unit 32 and the input unit 34 are connected with the information processing device 30 via communication means. Alternatively, while the display control unit 39 is included in the computing unit 31 of the information processing device 30 in the present embodiment, the display control unit 39 may be included in the machine tool 10 or may be included in a device other than the machining system 1 such as in a cloud that can be connected via certain communication means.

<Manual Cleaning Mode>

The information processing device 30 included in the machining system 1 may have a "manual cleaning mode" in addition to the automated cleaning mode and the instructed cleaning mode described above. In the manual cleaning mode, the operator touches a circle displayed on a taken image, and freely slides the circle. The path of the circle indicated by the slide operation is the coolant discharge path.

In the mode selection area 51 (see FIG. 3), a manual cleaning mode selecting region may be provided in addition to the automated cleaning mode selecting region 54 and the instructed cleaning mode selecting region 55. When the manual cleaning mode is selected by the operator, the information processing device 30 enters the manual cleaning mode. The manual cleaning mode is the same as the instructed cleaning mode in that the operator indicates a discharge path on the screen, but differs from the instructed cleaning mode in that the discharge path can be indicated as a curve of any shape.

FIG. 23 is a diagram of a screen for specifying a coolant discharge path in the manual cleaning mode.

FIG. 23 illustrates a taken image of the inside of a machining chamber. In the manual cleaning mode, the display control unit 39 specifies a position to which coolant is to be discharged on the basis of the current direction of the nozzle, and displays a circle 100 at the position to which coolant is to be discharged on the taken image. The circle 100 allows the operator to visually recognize the position to which coolant is to be discharged.

The position of the circle 100 corresponds to the start point of the coolant discharge path. Subsequently, after touching the circle 100, the operator slides the circle 100 as illustrated in a lower screen in FIG. 23. The point at which the circle 100 is touched corresponds to the start point of the coolant discharge path, and the point at which the circle 100 is released corresponds to the end point of the discharge path. The input unit 34 transmits two-dimensional coordinates (screen coordinates) of the start point, the end point, and a plurality of points on the slide path to the detecting unit 38. The detecting unit 38 notifies the display control unit 39 of the group of two-dimensional coordinates, and the display control unit 39 converts the two-dimensional coordinate values (screen coordinates) into three-dimensional positional coordinates (machine coordinates) in the machining chamber. The display control unit 39 may display the slide path on the screen.

The display control unit 39 generates control signals including the group of machine coordinates of the points on the slide path, and transmits the control signals to the liquid discharging portion 11.

FIG. 24 is a diagram of a screen showing a coolant discharge state in the manual cleaning mode.

The start point of the discharge path specified in the manual cleaning mode, that is, the position where the circle 100 is initially displayed, is an initial discharge target point 303. As illustrated in a lower screen in FIG. 24, the liquid discharging portion 11 moves the discharge target point 303 along the specified coolant discharge path. In this manner, the liquid discharging portion 11 discharges coolant along the discharge path specified freehand by the operator.

The liquid discharging portion 11 sets a coolant discharging time to be slower than the time taken for the operator to specify the coolant discharge path through the slide operation. For example, assume that the time taken for the operator to move the circle 100 from the start point to the end point on a taken image is a set time T1. In this case, the liquid discharging portion 11 takes a discharge time T2 to change the coolant discharge direction from the start point to the end point. The discharge time T2 is longer than the set time T1. More specifically, the display control unit 39 measures the set time T1 and notifies the liquid discharging portion 11 of the measured set time T1. The liquid discharging portion 11 sets a time of 2.0 times the set time T1, for example, as the discharge time T2. Such a control method allows the operator to also intuitively control the coolant discharge time depending on the speed of the slide operation. Typically, the slide operation is merely a movement of a finger, which ends in a short time, but a sufficient time needs to be taken to discharge coolant for chip removal. Thus, the discharge time T2 is preferably longer than the set time T1.

<Area Cleaning Mode>

The information processing device 30 may have an "area cleaning mode" in addition to the automated cleaning mode, the instructed cleaning mode, and the manual cleaning mode described above.

In the area cleaning mode, the operator specifies a "selected area" having a limited area on the taken image. In the area cleaning mode, discharge of coolant is focused onto the selected area.

Figure 25:
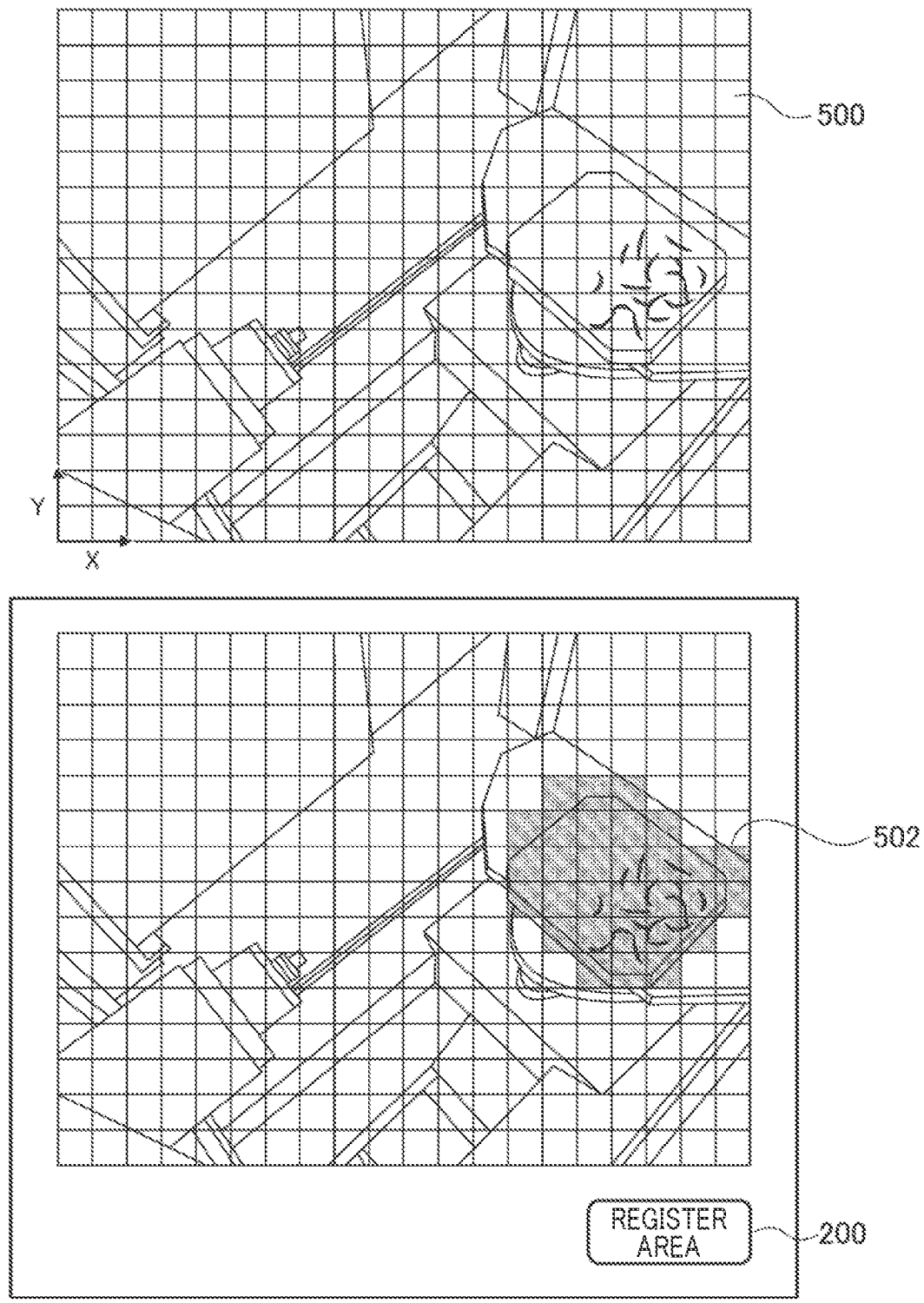
FIG. 25 is a diagram of a screen for specifying a selected area in an area cleaning mode.

FIG. 25 is a diagram of a screen for specifying a selected area in the area cleaning mode.

The imaging portion 12 sets a range in which chips may accumulate as an imaging range. In FIG. 24, many of scattered chips drop on the pallet 14.

The dividing unit 36 sets a large number of grid regions 500 of a taken image of a square or rectangular shape having a predetermined size. The operator can freely change both or one of the size and the shape of the grid regions 500 on the screen. When the dividing unit 36 is instructed to change the size of the grid regions 500, the dividing unit 36 resets the grid regions 500.

The operator can select any one or more grid regions 500 on the taken image. The operator touches grid regions 500 to be included in the selected area 502. One or more grid regions 500 selected in this manner constitute the selected area 502. After the selected area 502 is determined, the operator touches a register area button 200 to register the selected area.

The selected area is an area (hereinafter referred to as a "cleaning area") to be cleaned with coolant. In FIG. 25, the selected area 502 is set on the pallet 14. In other words, part of the pallet 14 is the cleaning area.

For setting the grid regions 500, the operator touches the grid regions 500. In this process, the display control unit 39 displays the selected grid regions 500 with a shaded pattern. When the operator touches the register area button 200 after selecting one or more grid regions 500, the display control unit 39 sets an area ID to the grid regions 500. A grid ID is assigned to each grid region 500 in advance, and the area ID is associated with the grid IDs of the one or more selected grid regions 500. The display control unit 39 registers the area ID and the grid IDs as "selected area data" into the storage unit 33.

FIG. 26 is a diagram of a screen showing a coolant discharge path in the area cleaning mode.

After the register area button 200 is touched to register the selected area 502, the display control unit 39 displays a screen as illustrated in an upper screen in FIG. 26. The display control unit 39 detects the presence possibility or the presence amount (hereinafter referred to the "presence level") of chips in the grid regions 500 included in the selected area 502 from the images, and displays the grid regions 500 in different colors depending on the presence levels. In FIG. 26, grid regions 500 with a light shaded pattern mean "no chips" (class 0). Grid regions 500 with an intermediate shaded pattern mean "a small volume of chips" (class 1). Grid regions 500 with a dark shaded pattern mean "a large volume of chips" (class 2). The method for determining the presence level of chips is similar to that explained with reference to FIG. 18.

When a generate path button 202 is touched, the display control unit 39 causes a path generation screen as illustrated in a lower part of FIG. 26 to be displayed. The operator specifies a coolant discharge path on the selected area 502 on the taken image.

In FIG. 26, the operator has touched a start point 504 represented by an open circle, seven bending points 506 represented by X marks, and an endpoint 508 represented by a black solid circle.

The display control unit 39 causes a fluid (coolant) discharge path to be displayed in at least a partial area (selected area 502) of an imaged area on the taken image on the basis of the touch operation. When the operator touches a clear button 210, the discharge path on the screen is deleted. When the operator touches a quit button 214, the display control unit 39 stores the discharge path specified on the screen into the storage unit 33 and closes the path generation screen.

The information processing device 30, the machine tool 10, and the discharging method according to the present disclosure are implemented by cooperation of hardware resources, such as a processor and a memory, and programs, for example. The present disclosure is not limited to the presented embodiment, and various improvements and design modifications can be made within the scope of the present disclosure.

In the present embodiment, a first position and a second position on an image of the inside of the machine tool 10 are input by user operations, and the first position, the second position, and a fluid discharge path connecting the first position with the second position are superimposed on image data of the inside of the machine tool 10 when displayed, which facilitates generation of an appropriate fluid discharge path.

Furthermore, as a result of user operations for causing a via-point to appear at some point on a fluid discharge path and moving the via-point, a fluid discharge path connecting the first position, the via-point, and the second position is displayed, which also facilitates generation of a bendy fluid discharge path.

Furthermore, display enables recognition of the difference in the chip volume between a first grid image and a second grid image, and therefore users can easily know whether the chip volume is large or small at each position.

CROSS REFERENCE TO RELATED APPLICATIONS is a continuation application of International Application No. PCT/JP2022/021261, filed on May 24, 2022, which claims priority to Japanese Patent Application No. 2021-086694 filed on May 24, 2021, which is incorporated herein by reference in its entirety.

What is claimed is:

1. An information processing device that generates a fluid discharge path for discharging fluid into a machine to move chips, the information processing device comprising:
   a detecting unit for detecting a first input signal for a first position on an image of the machine and a second input signal for a second position on the image of the machine; and
   a display control unit for performing control to display (i) the first position, (ii) the second position, and (iii) a discharge path connecting the first position with the second position to be superimposed on image data of the machine, wherein
   if the discharge path between the first position and the second position is selected, the display control unit performs control to display a via-point between the first position and the second position, and
   if the via-point is moved, the display control unit performs control to display a discharge path connecting three positions that are (a) the first position, (b) the via-point after being moved, and (c) the second position in this order.

2. The information processing device according to claim 1, wherein
   the detecting unit detects a third input signal relating to multiple discharges, and
   if the third input signal is detected after the first input signal and the second input signal are detected, the display control unit performs control to display a discharge path having a quadrangle shape.

3. The information processing device according to claim 1, wherein the display control unit divides image data obtained by imaging into a plurality of grid sections including a first grid section and a second grid section, and
   if a chip volume detected from image data corresponding to the first grid section and a chip volume detected from image data corresponding to the second grid section are different from each other, the display control unit performs control to display the first grid section and the second grid section superimposed on the image data in a manner that the difference in the chip volume can be recognized.

4. An information processing device that generates a liquid discharge path for discharging liquid to a target area in a machine to move chips, the machine including a liquid discharging portion for discharging liquid to move chips produced during machining of a workpiece, and an imaging portion for imaging the target area in the machine in which chips produced during machining of the workpiece is to be detected, the liquid discharge path being generated on the basis of a first position and a second position on an image taken by the imaging portion of the machine, the information processing device comprising:
   a detecting unit for detecting a first input signal for the first position and a second input signal for the second position; and
   a display control unit for performing control to display (i) the first position, (ii) the second position, and (iii) a discharge path connecting the first position with the second position to be superimposed on image data taken by the imaging portion, wherein
   if the discharge path between the first position and the second position is selected, the display control unit performs control to display a via-point between the first position and the second position, and
   if the via-point is moved, the display control unit performs control to display a discharge path connecting three positions that are (a) the first position, (b) the via-point after being moved, and (c) the second position in this order.

* * * * *